US010411241B2

(12) United States Patent
Kang

(10) Patent No.: US 10,411,241 B2
(45) Date of Patent: Sep. 10, 2019

(54) BATTERY INCLUDING AN INSULATION SPACER

(71) Applicant: SAMSUNG SDI CO., LTD., Yongin-si, Gyeonggi-do (KR)

(72) Inventor: Seonyeong Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 673 days.

(21) Appl. No.: 14/826,169

(22) Filed: Aug. 13, 2015

(65) Prior Publication Data

US 2016/0049633 A1 Feb. 18, 2016

(30) Foreign Application Priority Data

Aug. 14, 2014 (KR) .................. 10-2014-0106231
Aug. 14, 2014 (KR) .................. 10-2014-0106232
Apr. 6, 2015 (KR) .................. 10-2015-0048323

(51) Int. Cl.
  *H01M 2/26* (2006.01)
  *H01M 2/30* (2006.01)
  *H01M 2/22* (2006.01)
  *H01M 2/14* (2006.01)
  *H01M 2/04* (2006.01)

(52) U.S. Cl.
  CPC ............. *H01M 2/263* (2013.01); *H01M 2/14* (2013.01); *H01M 2/22* (2013.01); *H01M 2/26* (2013.01); *H01M 2/30* (2013.01); *H01M 2/0426* (2013.01); *H01M 2/0469* (2013.01); *H01M 2/0473* (2013.01); *H01M 2/266* (2013.01)

(58) Field of Classification Search
  CPC .......... H01M 2/263; H01M 2/14; H01M 2/22; H01M 2/30; H01M 2/26; H01M 2/0469; H01M 2/0473; H01M 2/0426; H01M 2/266
  USPC ..................................................... 429/211
  See application file for complete search history.

(56) References Cited

U.S. PATENT DOCUMENTS

| 2003/0111512 A1 | 6/2003 | O'Connell et al. |
| 2006/0141355 A1 | 6/2006 | Kang |
| 2007/0105015 A1 | 5/2007 | Munenaga et al. |
| 2007/0160904 A1 | 7/2007 | Uh |

(Continued)

FOREIGN PATENT DOCUMENTS

| EP | 1 659 651 A1 | 5/2006 |
| EP | 2 154 738 A1 | 2/2010 |

(Continued)

OTHER PUBLICATIONS

EPO Search Report dated May 12, 2016, for corresponding European Patent application 15180603.1, (12 pages).

(Continued)

*Primary Examiner* — Gary D Harris
(74) *Attorney, Agent, or Firm* — Lewis Roca Rothgerber Christie LLP

(57) ABSTRACT

A battery including an electrode assembly having an electrode tab; an insulating spacer having a welding groove at which the electrode tab protruding from the electrode assembly is assembled to the insulating spacer; and an electrode lead to which the electrode tab is welded. In the insulating spacer, the welding groove for exposing the electrode tab is formed at a location where the electrode tab is assembled to the insulating spacer.

18 Claims, 20 Drawing Sheets

(56) References Cited

U.S. PATENT DOCUMENTS

| | | | |
|---|---|---|---|
| 2007/0196732 A1* | 8/2007 | Tatebayashi | B60L 11/123 |
| | | | 429/181 |
| 2007/0232123 A1 | 10/2007 | Uh | |
| 2009/0155632 A1 | 6/2009 | Byun et al. | |
| 2010/0035132 A1 | 2/2010 | Park | |
| 2010/0092859 A1 | 4/2010 | Kim et al. | |
| 2011/0244318 A1 | 10/2011 | Cho et al. | |
| 2011/0287291 A1 | 11/2011 | Byun et al. | |
| 2011/0287302 A1 | 11/2011 | Kim | |
| 2012/0219849 A1 | 8/2012 | Kim | |
| 2012/0308855 A1* | 12/2012 | Shimizu | H01M 2/0426 |
| | | | 429/53 |
| 2013/0011723 A1 | 1/2013 | Cho et al. | |
| 2013/0202932 A1 | 8/2013 | Song et al. | |
| 2013/0295444 A1* | 11/2013 | Kim | H01M 2/266 |
| | | | 429/179 |
| 2016/0248072 A1* | 8/2016 | Jang | H01M 2/30 |

FOREIGN PATENT DOCUMENTS

| | | |
|---|---|---|
| EP | 2 498 318 A1 | 9/2012 |
| EP | 2 506 358 A1 | 10/2012 |
| EP | 2 538 467 A1 | 12/2012 |
| EP | 2 597 703 A1 | 5/2013 |
| EP | 2 178 134 B1 | 11/2017 |
| JP | 11-25993 A | 1/1999 |
| JP | 11-26008 A | 1/1999 |
| JP | 3332783 B2 | 10/2002 |
| JP | 2006-108018 A | 4/2006 |
| JP | 2009-87727 A | 4/2009 |
| JP | 2011-70918 A | 4/2011 |
| JP | 2013-175516 A | 9/2013 |
| JP | 5481527 B2 | 4/2014 |
| JP | 2015-041615 A | 3/2015 |
| KR | 10-2006-0059703 A | 6/2006 |
| KR | 10-2007-0107921 | 11/2007 |
| KR | 10-2008-0035400 A | 4/2008 |
| KR | 10-2011-0111700 A | 10/2011 |
| KR | 10-2011-0127830 A | 11/2011 |
| KR | 10-2012-0097973 A | 9/2012 |
| KR | 10-2012-0108045 | 10/2012 |
| KR | 10-2013-0090190 A | 8/2013 |
| WO | WO 2013/125153 A1 | 8/2013 |
| WO | WO 2016/003361 A | 1/2016 |

OTHER PUBLICATIONS

EPO Search Report dated May 12, 2016, for corresponding European Patent application 15180599.1, (11 pages).
EPO Search Report dated May 12, 2016, for corresponding European Patent application 15180600.7, (13 pages).
KIPO Office Action dated Aug. 22, 2016 for corresponding Korean Patent Application No. 10-2015-0048323 (9 pages).
U.S. Office Action dated Sep. 21, 2017, issued in cross-reference U.S. Appl. No. 14/826,160 (8 pages).
U.S. Office Action dated Sep. 22, 2017, issued in cross-reference U.S. Appl. No. 14/826,165 (8 pages).
U.S. Final Office Action dated Jan. 26, 2018, issued in U.S. Appl. No. 14/826,160 (6 pages).
EPO Search Report dated Jan. 21, 2016, corresponding to European Patent application 15180600.7, (7 pages).
Patent Abstracts of Japan and Machine English Translation of JP 11-25993 A, Jan. 29, 1999, 20 Pages.
Patent Abstracts of Japan and Machine English Translation of JP 11-26008 A, Jan. 29, 1999, 14 Pages.
Patent Abstracts of Japan and Machine English Translation of JP 10-241741, Corresponding to JP 3332783 B2, Oct. 7, 2002, 15 Pages.
Machine English Translation of JP 2006-108018 A, Apr. 20, 2006, 31 Pages.
Patent Abstracts of Japan and Machine English Translation of JP 2011-70918 A, Apr. 7, 2011, 30 Pages.
Machine English Translation of JP 5481527 B2, Apr. 23, 2014, 45 Pages.
EPO Search Report dated Jan. 25, 2016, corresponding to European Patent application 15180603.1, (7 pages).
EPO Search Report dated Jan. 22, 2016, for corresponding European Patent application 15180599.1, (7 pages).
EPO Office Action dated May 8, 2018, for corresponding European Patent Application No. 15180599.1 (5 pages).
Extended European Search Report for corresponding European Patent Application No. 19160153.3, dated Jun. 24, 2019, 19 pages.

* cited by examiner

BATTERY INCLUDING AN INSULATION SPACER

CROSS-REFERENCE TO RELATED APPLICATION

This application claims priority to and the benefit of Korean Patent Application No. 10-2014-0106232, filed on Aug. 14, 2014, Korean Patent Application No. 10-2014-0106231, filed on Aug. 14, 2014, and Korean Patent Application No. 10-2015-0048323, filed on Apr. 6, 2015, in the Korean Intellectual Property Office, the entire contents of which are incorporated herein by reference.

BACKGROUND

1. Field

One or more aspects of the present invention relate to a battery.

2. Description of the Related Art

Unlike primary batteries that are not designed to be rechargeable, in general, secondary batteries are rechargeable and dischargeable. Along with the development of technology related to mobile devices and increased production of mobile devices, secondary batteries are used as energy sources for mobile devices, such as mobile phones and laptops. Recently, much research has been conducted regarding the use the secondary batteries in electric automobiles and hybrid automobiles as an alternative energy source that can replace fossil fuels.

SUMMARY

Aspects of one or more embodiments of the present invention are directed toward a battery including an electrode tab, where an insulating property of the electrode assembly is improved.

Aspects of one or more embodiments of the present invention are directed toward a battery in which an insulating property of an electrode tab of an electrode assembly is firmly maintained even in harsh environments having high frequency vibrations or impacts, such as impacts that result when the battery is dropped.

Additional aspects will be set forth or will be apparent from the following description, or may be learned by practice of the presented embodiments.

According to one or more embodiments of the present invention, a battery includes an electrode assembly including an electrode tab protruding from the electrode assembly; an insulating spacer including a welding groove at which the electrode tab protruding from the electrode assembly is assembled to the insulating spacer; and an electrode lead to which the electrode tab is welded. In the insulating spacer, the welding groove for exposing the electrode tab is at a location where the electrode tab is assembled to the insulating spacer.

The battery may further include an insulator that is on and coupled to the insulating spacer to seal the welding groove.

The insulator may couple the electrode assembly and the insulating spacer to each other.

The insulator may completely surround the electrode assembly and the insulating spacer.

The insulator may be a polymer film that becomes an adhesive when the insulator reacts with electrolyte.

The welding groove may extend through a front side and a back side of the insulating spacer.

A height of the welding groove may be defined by a first rib and a second rib that are at a front side and a back side of the insulating spacer, respectively.

The first and second ribs may be at a lower portion of the insulating spacer. The welding groove may be at an upper portion of the first and second ribs.

The first rib at the front side may be at an upper portion of the insulating spacer. The second rib at the back side may be at a lower portion of the insulating spacer. The welding groove may include a space between the first and second ribs.

The insulating spacer may include a surface which faces the electrode assembly, the surface being either an upper surface or a lower surface of the insulating spacer, and the surface having a largest contact area from among the upper surface and the lower surface of the insulating spacer.

The insulating spacer may be coupled to a cap plate.

Either the insulating spacer or the cap plate may include a protrusion. Whichever of the insulating spacer and the cap plate that does not include the protrusion may have an opening (e.g., a hole) or a concave unit having a shape corresponding to the protrusion.

The insulating spacer may be between a cap plate and the electrode lead.

The welding groove may be wider than the electrode tab.

The electrode assembly may include a positive electrode plate, a negative electrode plate, and a separator between the positive and negative electrode plates. The positive electrode plate may be at an outermost side of the electrode assembly.

The electrode lead may be around the welding groove of the insulating spacer. The electrode lead may be wider than the welding groove. The electrode lead may be partially or entirely formed in two layers.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
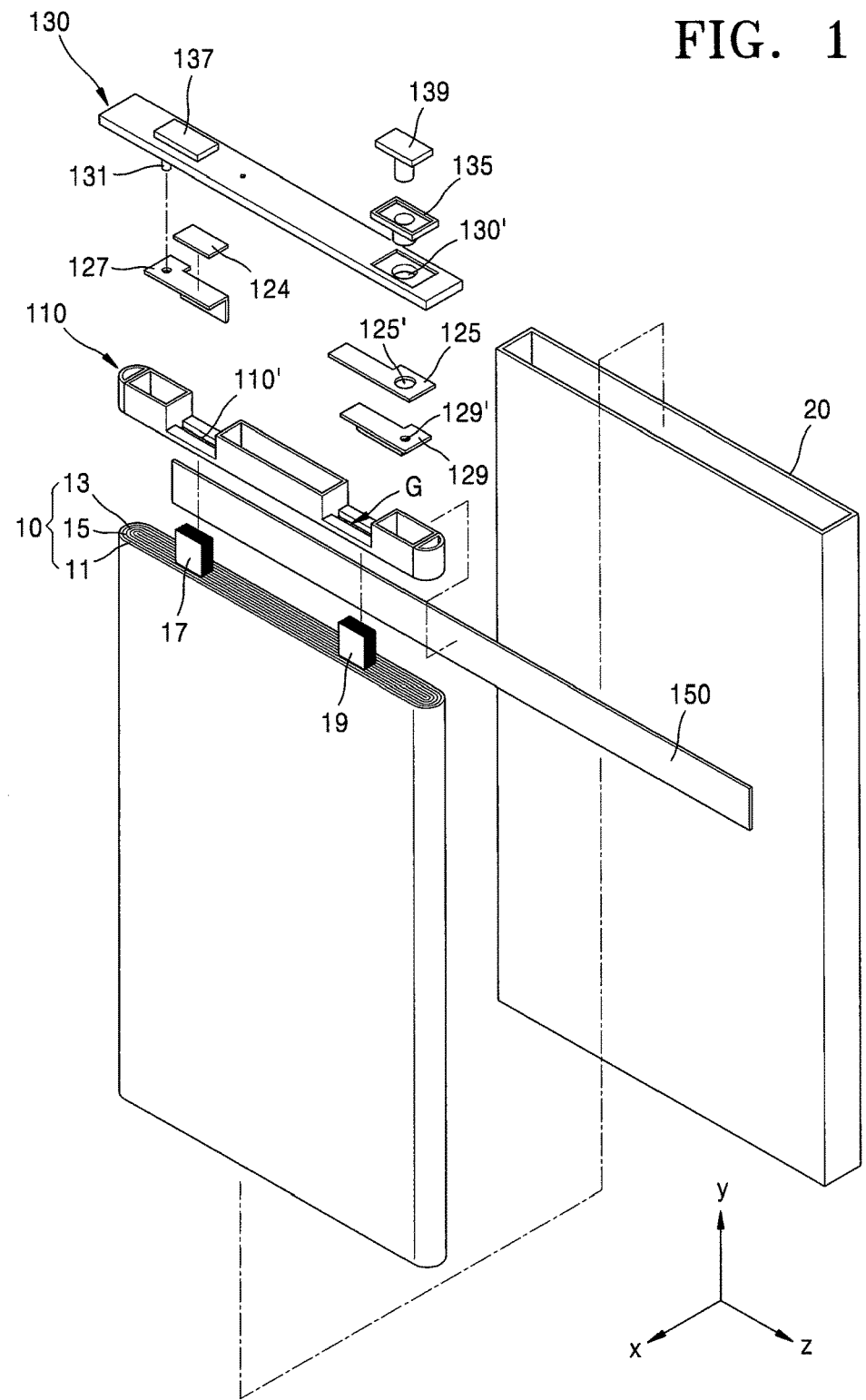
FIG. 1 is an exploded perspective view of a battery according to an embodiment of the present invention.

A battery according to embodiments of the present invention will be described in detail with reference to the accompanying drawings. Like reference numerals in the drawings denote like elements, and thus their repeated description may be omitted in different embodiments having the same or similar elements to previously described embodiments. Expressions such as "at least one of," when preceding a list of elements, modify the entire list of elements and do not modify the individual elements of the list. Also, when a first element is described as being "coupled to" or "connected to" a second element, the first element may be directly "coupled to" or "connected to" the second element or indirectly "coupled to" or "connected to" the second element with one or more intervening elements interposed therebetween. As used herein, the terms "use," "using," and "used" may be considered synonymous with the terms "utilize," "utilizing," and "utilized," respectively. The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

FIG. 1 is an exploded perspective view of a battery according to an embodiment of the present invention.

Referring to FIG. 1, the battery includes an electrode assembly 10, an insulating spacer 110 on the electrode assembly 10, a case 20 that accommodates the electrode assembly 10 and the insulating spacer 110, and a cap plate 130 that covers an upper portion of the case 20.

The electrode assembly 10 is a rechargeable secondary battery and may be a lithium-ion battery. The electrode assembly 10 may include a positive electrode plate 11, a negative electrode plate 13, and a separator 15. The electrode assembly 10 may be sealed inside the case 20 with electrolytes.

For example, the electrode assembly 10 may be formed by winding a stack formed of the positive electrode plate 11, the negative electrode plate 13, and the separator 15 in the form of a jelly roll. The positive electrode plate 11 may be formed by coating a positive active material on at least one surface of a positive collector. Similarly, the negative electrode plate 13 may be formed by coating a negative active material on at least one surface of a negative collector. For example, according to an embodiment of the present invention, the positive electrode plate 11 may be disposed at an outermost side of the electrode assembly 10. Heat emission through the case 20 is accelerated by disposing the positive electrode assembly that emits relatively large amount of heat at an outer side near the case 20. For example, the positive electrode assembly may directly or thermally contact the case 20. The term "thermally contact" can refer to a state in which that two elements do not directly contact one another but thermal interaction is allowed between the elements.

The electrode assembly 10 may be introduced and accommodated in the case 20 with electrolytes through an upper opening of the case 20. The upper opening of the case 20 may be sealed by the cap plate 130. A portion where the cap plate 130 contacts the case 20 may be welded by a laser and thus may have an air-tight seal.

A positive electrode tab 17 and a negative electrode tab 19 may be connected to at least one portion of the positive electrode plate 11 and the negative electrode plate 13, respectively. In the present specification, the positive and negative electrode tabs 17 and 19 may be referred to as "electrode tabs 17 and 19." A high-capacity high-output battery may include a plurality of positive electrode tabs 17 and a plurality of negative electrode tabs 19 that project from the electrode assembly 10. High-current electric output may be obtained and resistance loss may be reduced by including the plurality of positive electrode tabs 17 and negative electrode tabs 19.

The positive electrode tab 17 may be connected to the cap plate 130, and the negative electrode tab 19 may be connected to a negative electrode terminal 139 that projects from an upper surface of the cap plate 130. For example, a positive electrode terminal 137 and the negative electrode terminal 139 may be exposed through the upper surface of the cap plate 130. The positive electrode terminal 137 may be formed as a portion that integrally protrudes from the cap plate 130 or an additional element that is coupled to the cap plate 130. The positive electrode terminal 137 may have a positive polarity that is the same or substantially the same as the cap plate 130. The negative electrode terminal 139 may be assembled to penetrate through the cap plate 130. The negative electrode terminal 139 may be insulated from and coupled to the cap plate 130 and may protrude from the upper surface of the cap plate 130.

The positive and negative electrode tabs 17 and 19 may each be gathered in the form of a single pack, inserted into a tab hole (i.e., tab opening) 110' of the insulating spacer 110, and penetrate through an upper portion of the insulating spacer 110. Upper ends of the positive and negative electrode tabs 17 and 19 that penetrate through the insulating spacer 110 may be connected to a positive electrode lead 127 and a negative electrode lead 129, respectively.

Before the positive electrode tab 17 is inserted into the insulating spacer 110, the plurality of positive electrode tabs 17 may be gathered into the form of a single pack by temporary welding. The plurality of positive electrode tabs 17 gathered in a single pack by temporary welding may be easily inserted into the tab hole 110'. Similarly, before the negative electrode tab 19 is inserted into the insulating spacer 110, the plurality of negative electrode tabs 19 may be gathered in a single pack by temporary welding.

The positive electrode tab 17 protrudes through the upper portion of the insulating spacer 110 by penetrating through the tab hole 110' of the insulating spacer 110 and the upper end of the positive electrode tab 17 is connected to the positive electrode lead 127. Also, the positive electrode lead 127 is connected to the cap plate 130. Accordingly, the positive electrode tab 17 of the electrode assembly 10 is electrically connected with the cap plate 130 via the positive electrode lead 127. The entire cap plate 130 may have a positive polarity that is the same or substantially the same as the positive electrode tab 17, or alternatively, a portion of the cap plate 130 may protrude to form the positive electrode terminal 137.

Figure 2:
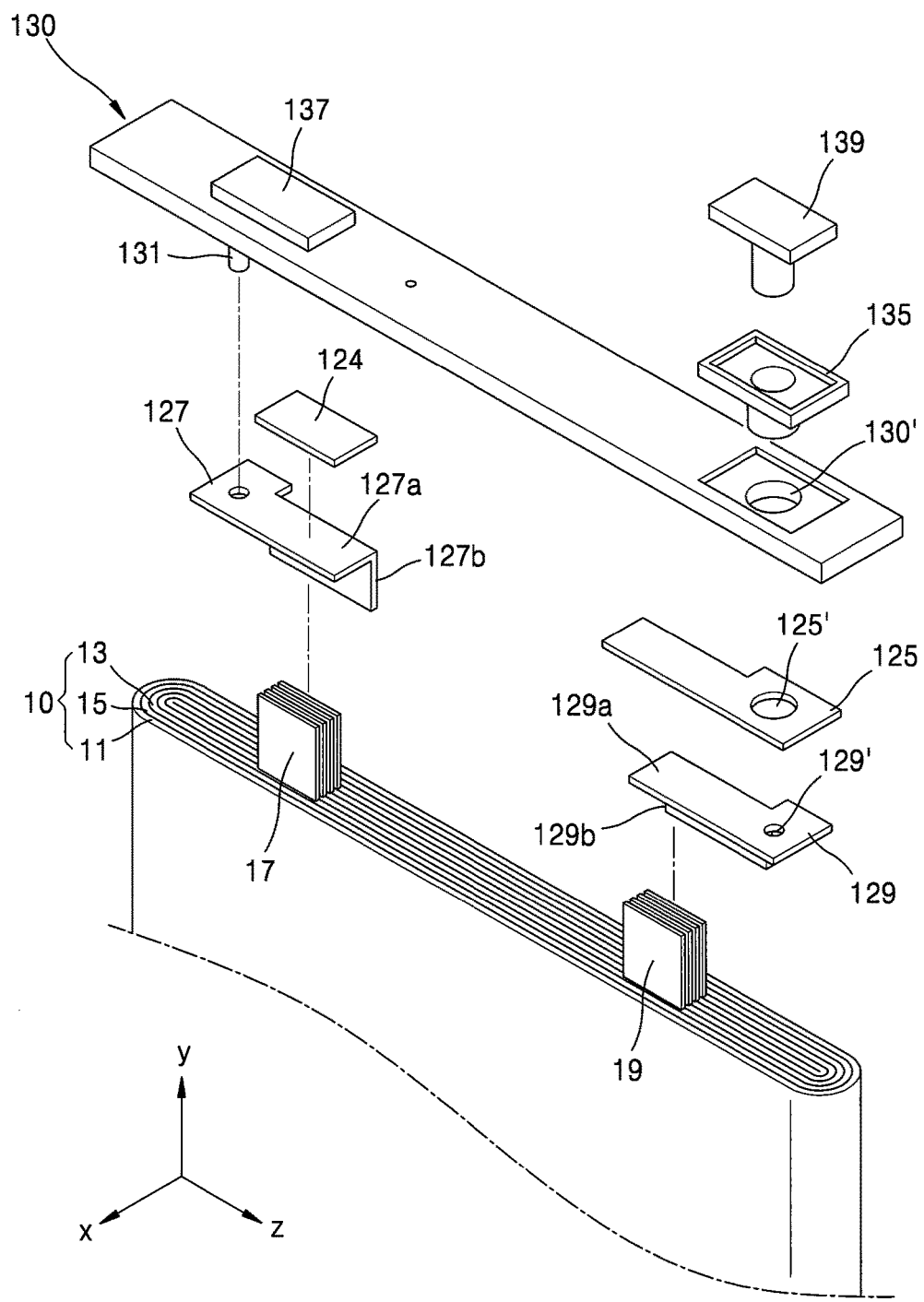
FIG. 2 is an exploded perspective view of some elements of FIG. 1.

FIG. 2 is an exploded perspective view of some elements illustrated in FIG. 1. Referring to FIG. 2, the positive electrode lead 127 may be bent in an 'L' shape. In more detail, the positive electrode lead 127 may be bent and extend in two different directions. A first part 127a of the positive electrode lead 127 may face the cap plate 130 and may be coupled to the cap plate 130. Also, a second part 127b of the positive electrode lead 127, which extends in a different direction from the first part 127a, may face the positive electrode tab 17 and may be coupled to the positive electrode tab 17. Therefore, in order to be coupled to the positive electrode tab 17 and the cap plate 130, the positive electrode lead 127 may be bent in different directions such that the first and second parts 127a and 127b face counterparts with which they are coupled.

Figure 3:
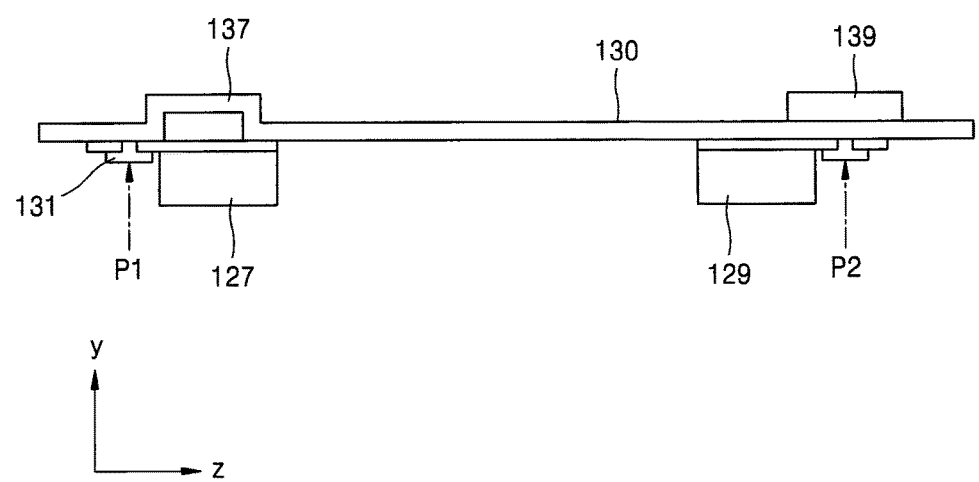
FIG. 3 is a diagram illustrating a coupling structure between elements of FIG. 2.

FIG. 3 is a diagram illustrating a coupling structure between elements illustrated in FIG. 2.

Referring to FIG. 3, the positive electrode lead 127 may be coupled to the cap plate 130 by using a coupling pin 131 that protrudes from the cap plate 130. For example, the coupling pin 131 that protrudes from a lower surface of the cap plate 130 may penetrate through the positive electrode lead 127, and a lower end of the coupling pin 131 that is exposed through a lower surface of the positive electrode lead 127 may be pressed onto the lower surface of the positive electrode lead 127 by using a riveting method or a spinning method (refer to a coupling position P1). For example, during the riveting process, the lower end of the coupling pin 131, which is exposed through the lower surface of the positive electrode lead 127, is hit with a hammer so that the lower end of the coupling pin 131 is pressed onto the lower surface of the positive electrode lead 127. During the spinning process, pressure is applied to the lower end of the coupling pin 131 that is exposed through the lower surface of the positive electrode lead 127 with a quickly rotating manufacturing tool so that the lower end of the coupling pin 131 is pressed onto the lower surface of the positive electrode lead 127. Alternatively, the positive electrode lead 127 and the cap plate 130 may be welded to each other.

Referring to FIGS. 1 and 2, the negative electrode tab 19 penetrates through the tab hole 110' of the insulating spacer 110 and protrudes through the upper portion of the insulating spacer 110, and an exposed upper end of the negative electrode tab 19 is connected to the negative electrode lead 129. Next, the negative electrode lead 129 is coupled to the negative electrode terminal 139. Accordingly, the negative electrode tab 19 of the electrode assembly 10 is electrically connected to the negative electrode terminal 139 via the negative electrode lead 129. As a reference, in the present specification, the positive and negative electrode leads 127 and 129 may be referred to as "electrode leads 127 and 129."

The negative electrode lead 129 may be bent (e.g., along the z direction) in an 'L' shape. In other words, a first part 129a of the negative electrode lead 129 may face the cap plate 130 and may be coupled to the cap plate 130. Also, a second part 129b of the negative electrode lead 129, which extends along a different direction (e.g., along the y direction) from the first part 129a, may face the negative electrode tab 19 and may be coupled to the negative electrode tab 19. In order to be coupled to the cap plate 130 and the negative electrode tab 19, the negative electrode lead 129 may be bent in different directions such that the first and second parts 129a and 129b face counterparts with which they are coupled. However, the embodiments of the present invention are not limited thereto, and for example, the negative electrode lead 129 may be shaped in the form of a flat plate.

The negative electrode terminal 139 is assembled in the cap plate 130 with a gasket 135 between the negative electrode terminal 139 and the cap plate 130. The cap plate 130 includes a terminal hole (i.e., a terminal opening) 130' through which the negative electrode terminal 139 passes. The negative electrode terminal 139 is inserted into the terminal hole 130' of the cap plate 130 with the gasket 135 in between, and thus, the negative electrode terminal 139 may be electrically insulated from the cap plate 130. The gasket 135 may seal a surrounding area of the terminal hole 130' so that electrolytes accommodated in the case 20 do not leak out and external impurities are blocked from entering into the battery.

An insulating plate 125 may be provided between the negative electrode lead 129 and the cap plate 130 to electrically insulate the negative electrode lead 129 and the cap plate 130. The insulating plate 125 and the gasket 135 electrically insulate the cap plate 130, which is electrically connected to the positive electrode tab 17 of the electrode assembly 10, from an opposite polarity. The negative electrode lead 129 and the insulating plate 125 may respectively include terminal holes (i.e., a terminal openings) 125' and 129' through which the negative electrode terminal 139 passes.

The negative electrode terminal 139 passes through the terminal holes 125', 129', and 130' of the insulating plate 125, the negative electrode lead 129, and the cap plate 130. When a lower portion of the negative electrode terminal 139 is pressed onto a lower surface of the negative electrode lead 129, the cap plate 130, the insulating plate 125, and the negative electrode lead 129 may be aligned and integrally coupled to one another.

For example, the negative electrode terminal 139 may be pressed onto the lower surface of the negative electrode lead 129 by stacking the cap plate 130, the negative electrode lead 129, and the insulating plate 125 on one another, inserting the negative electrode terminal 139 into the terminal holes 125', 129', and 130' from an upper portion of the cap plate 130, and performing a riveting or spinning process on the lower portion of the negative electrode terminal 139, which protrudes through the lower surface of the negative electrode lead 129.

Referring to FIG. 3, although the lower portion of the negative electrode terminal 139 is pressed onto the lower surface of the negative electrode lead 129, the lower portion of the negative electrode terminal 139 may be additionally welded so that the negative electrode terminal 139 is more stably attached to the negative electrode lead 129 (for example, at a coupling position P2). This is because the coupling of the negative electrode terminal 139 and the negative electrode lead 129 forms a charge/discharge path on a negative electrode side. An upper portion of the negative electrode terminal 139 may be formed as a plate protruding from a cylindrical body and may be pressed onto the upper surface of the cap plate 130.

Referring to FIG. 2, similar to the insulating plate 125 that is between the cap plate 130 and the negative electrode lead 129, an insulating plate 124 may be between the cap plate 130 and the positive electrode lead 127. Hereinafter, the insulating plate 125 near the negative electrode lead 129 is referred to as a "negative insulating plate 125," and the insulating plate 124 near the positive electrode lead 127 is referred to as a "positive insulating plate 124."

The positive insulating plate 124 may be prepared to maintain balance with the negative insulating plate 125. That is, the positive insulating plate 124 may be inserted to maintain the same or substantially similar distance between the cap plate 130 and the positive electrode lead 127 and between the cap plate 130 and the negative electrode lead 129. Also, the positive insulating plate 124 may be between the cap plate 130 and the positive electrode lead 127 to increase an adhesion strength generated when pressed together using the coupling pin 131.

Figure 4:
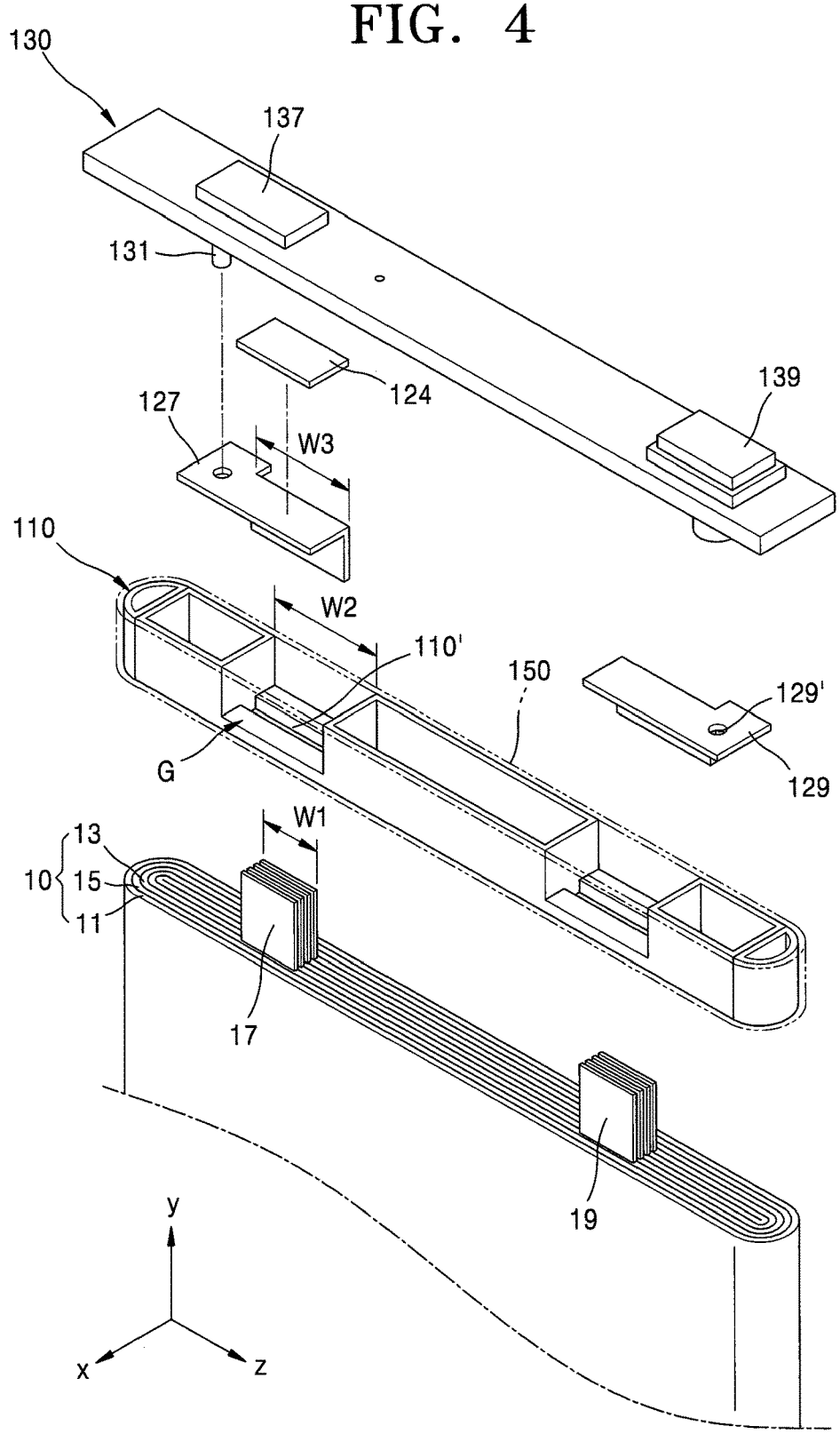
FIG. 4 is an exploded perspective view of some elements of FIG. 1.

FIG. 4 is an exploded perspective view of some elements of FIG. 1.

The insulating spacer 110 is between the electrode assembly 10 and the cap plate 130. The insulating spacer 110 is formed of an insulating material to prevent or substantially prevent electrical interference or a short circuit between the electrode assembly 10 and the cap plate 130. For example, the insulating spacer 110 may be between the electrode assembly 10 and the electrode leads 127 and 129. Also, the insulating spacer 110 gathers the plurality of electrode tabs 17 and 19 of the electrode assembly 10 so that electrical connection of the electrode leads 127 and 129 are easily conducted.

For example, the plurality of positive and negative electrode tabs 17 and 19 that protrude upward from the electrode assembly 10 may be gathered as they penetrate through the tab hole 110' of the insulating spacer 110. A pack of the positive and negative electrode tabs 17 and 19 that are gathered as described above may be electrically connected to the positive and negative electrode leads 127 and 129 by welding.

The insulating spacer 110 may secure an appropriate amount of space between the electrode assembly 10 and the cap plate 130 so that the electrode tabs 17 and 19 are insulated in the event that an external shock is applied, such as resulting from a fall or other causes.

The insulating spacer 110 may include a welding groove G to weld the electrode tabs 17 and 19 and the electrode leads 127 and 129. For example, the welding groove G may be formed at locations where the electrode tabs 17 and 19 are assembled to the insulating spacer 110. In one embodiment, the welding groove G may be formed on the tab hole 110' of the electrode tabs 17 and 19. The welding groove G may allow the positive and negative electrode tabs 17 and 19, which pass through the tab hole 110', to be exposed through the insulating spacer 110, and to be welded with the positive and negative electrode leads 127 and 129. For example, the electrode tabs 17 and 19 and the electrode leads 127 and 129 may be welded by ultrasonic welding.

Figure 5:
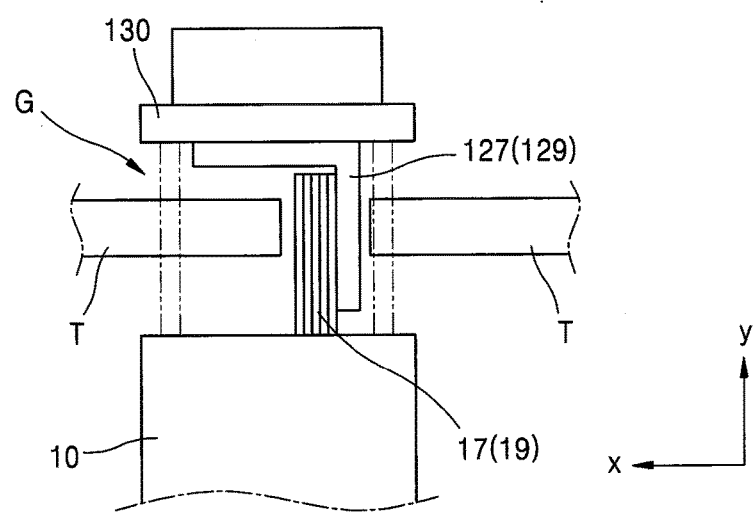
FIG. 5 is a diagram illustrating welding electrode tabs and electrode leads of FIG. 4.

FIG. 5 is a diagram illustrating welding the electrode tabs 17 and 19 and the electrode leads 127 and 129 of FIG. 4. Referring to FIG. 5, welding rods T having different polarities may be positioned such that they face each other, and the electrode tabs 17 and 19 and the electrode leads 127 and 129 may contact each other between the welding rods T. When a welding current is applied, the electrode tabs 17 and 19 and the electrode leads 127 and 129 may be welded to each other. Therefore, the welding grooves G may be open at front and back sides (in an x direction) to allow entry of the welding rods T that approach from the front and back sides (in the x direction). That is, the welding grooves G may be formed to penetrate front and back sides of the insulating spacer 110 where the electrode tabs 17 and 19 are assembled.

Referring to FIG. 4, a width W2 of the welding grooves G may be greater than a width W1 of the electrode tabs 17 and 19. This allows the welding rods T to approach more areas so that a welding strength between the electrode tabs 17 and 19 may be increased and working efficiency may be improved.

A width W3 of the electrode leads 127 and 129 may be greater than a width W2 of the welding grooves G. This is to seal the welding grooves G so that the electrode tabs 17 and 19 are not exposed outside through the welding grooves G. As described below, after welding the electrode tabs 17 and 19 and the electrode leads 127 and 129, the welding grooves G are sealed by using an insulator 150. However, before the insulator 150 is applied, the welding grooves G may be sealed so that the electrode tabs 17 and 19 are not exposed through the welding grooves G, and thus the electrode tabs 17 and 19 may be prevented or substantially prevented from being inaccurately assembled.

The electrode leads 127 and 129 may be around the welding grooves G. The electrode leads 127 and 129, which are relatively wide, may not be inserted into the welding grooves G, but may lean against a periphery of the insulating spacer 110 so that a supporting strength of the electrode leads 127 and 129 may be increased.

As a result, respective widths W1, W2, and W3 of the electrode tabs 17 and 19, the welding grooves G, and the electrode leads 127 and 129 may satisfy the inequality: the width W1 of each of the electrode tabs 17 and 19<the width W2 of each of the welding grooves G<the width W3 of each of the electrode leads 127 and 129.

After the electrode tabs 17 and 19 and the electrode leads 127 and 129 are welded, the welding grooves G may be sealed by the insulator 150. That is, the insulator 150 may seal the welding grooves G such that the electrode tabs 17 and 19 and the electrode leads 127 and 129 are not exposed to the outside. For example, the insulator 150 may be an insulating tape that is attached along a periphery of the insulating spacer 110 such that the welding grooves G formed near the positive and negative electrode tabs 17 and 19 are completely surrounded.

The insulator 150 may include a material that becomes an adhesive when it reacts with electrolytes. For example, the insulator 150 may be a polymer film (tape) that partially melts and becomes an adhesive when it reacts with the electrolytes. For example, the polymer film may be a film that partially or entirely melts due to a carbonate-based solvent (e.g., dimethyl carbonate (DMC), ethyl methyl carbonate (EMC), and propylene carbonate (PC)) that transmits between polymers when the film contacts the electrolyte. For example, the insulator 150 may be an oriented polystyrene (OPS) film.

In one example, the insulator 150 may be stored in the case 20 with electrolytes while being attached on the periphery of the insulating spacer 110. Here, the insulator 150 may have greater adhesion strength in response to the electrolyte. As a result, the welding grooves G may be more firmly sealed.

Figure 6:
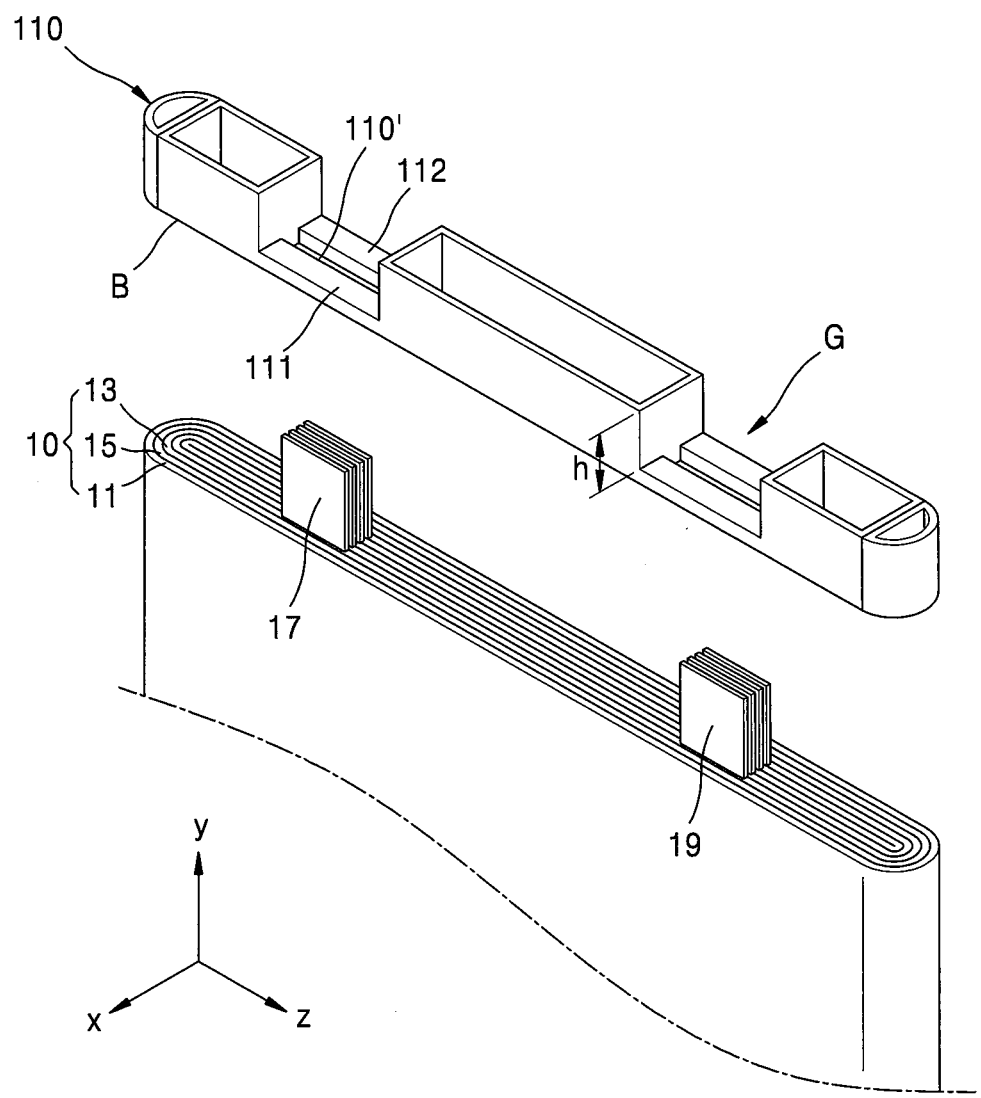
FIG. 6 is a perspective view of an insulating spacer of FIG. 4.

FIG. 6 is a perspective view of the insulating spacer 110 of FIG. 4.

Referring to FIG. 6, the welding grooves G may include first ribs 111 and second ribs 112 that are respectively formed at the front and back sides (in the x direction) of the locations where the electrode tabs 17 and 19 are assembled to the insulating spacer 110 (the tab holes 110') and have difference different height than other portions of the insulating spacer 110. A height h of the welding grooves G may be defined by the first and second ribs 111 and 112 that are formed at the front and back sides (in the x direction) of the insulating spacer 110. The first and second ribs 111 and 112 may be formed at the same or substantially the same level in a height (thickness) direction (a y direction) of the insulating spacer 110. For example, the first and second ribs 111 and 112 may be formed at a lower portion of the insulating spacer 110, and the welding grooves G may be formed at upper portions of the first and second ribs 111 and 112.

A bottom surface B of the insulating spacer 110, that is, a surface of the insulating spacer 110 which faces the electrode assembly 10, is flat. For example, the bottom surface B of the insulating spacer 110 may evenly apply pressure to an upper portion of the electrode assembly 10. However, if the bottom surface B of the insulating spacer 110 is not flat and has protrusions or has holes (e.g., openings) that may accommodate a portion of the electrode assembly 10, the protrusions may be inserted into the electrode assembly 10 or a portion of the electrode assembly 10 may be inserted into the holes, and thus, the electrode assembly 10 may be irregularly deformed and a short circuit may occur inside the electrode assembly 10.

The surface of the insulating spacer 110 which faces the electrode assembly 10 may be a surface with a larger contact area from among an upper surface and a lower surface of the insulating spacer 110. The term "contact area" refers to an area that contacts the electrode assembly 10. That is, the surface of the insulating spacer 110 which faces the electrode assembly 10 may be a surface with a larger contact area from among the upper and lower surfaces thereof. In addition, the surface of the insulating spacer 110 which faces the electrode assembly 10 may be a flat surface that has relatively few convex or concave portions.

Figure 7:
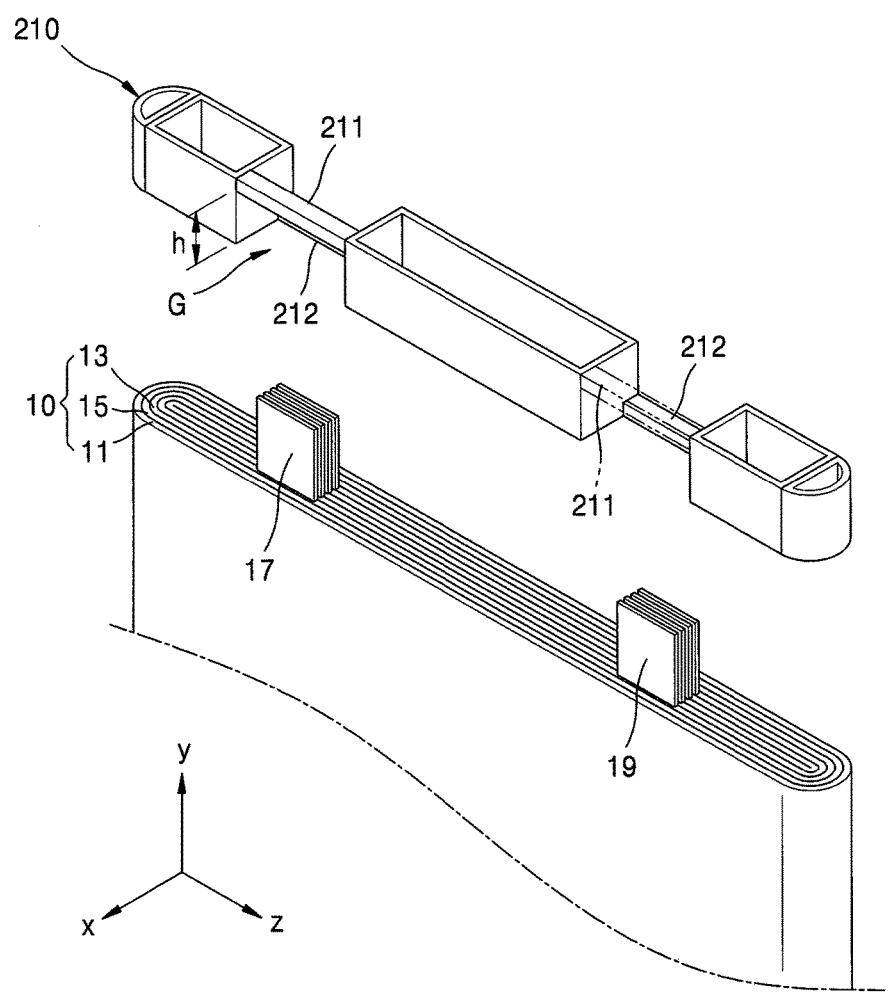
FIG. 7 is a perspective view of an insulating spacer according to another embodiment of the present invention.

FIG. 7 is a perspective view of an insulating spacer 210 according to another embodiment of the present invention. Referring to FIG. 7, the insulating spacer 210 may include welding grooves G for welding the electrode tabs 17 and 19 and the electrode leads 127 and 129. A height h of the welding grooves G may be defined by first ribs 211 and second ribs 212 that are formed at the front and back sides (in the x direction) of the locations where the electrode tabs 17 and 19 are assembled to the insulating spacer 110.

The first and second ribs 211 and 212 may be at different levels in the height direction (the y direction) of the insulating spacer 210. For example, the first ribs 211 at the front side may be formed at an upper portion, and the second ribs 212 at the back side may be formed at a lower portion. The upper and lower portions may be the highest level and the lowest level of the insulating spacer 210, respectively.

The first ribs 211 that are raised to the upper portion at the front side may allow the electrode tabs 17 and 19 to be directly assembled from the front side. That is, the electrode tabs 17 and 19 may be assembled from the front side to the back side (in the x direction), and thus, it is unnecessary to insert the electrode tabs 17 and 19 into the tab holes 110' as shown in FIG. 6. Accordingly, the assembling process may be more efficient and a manufacturing yield per time unit may be improved.

Figure 8:
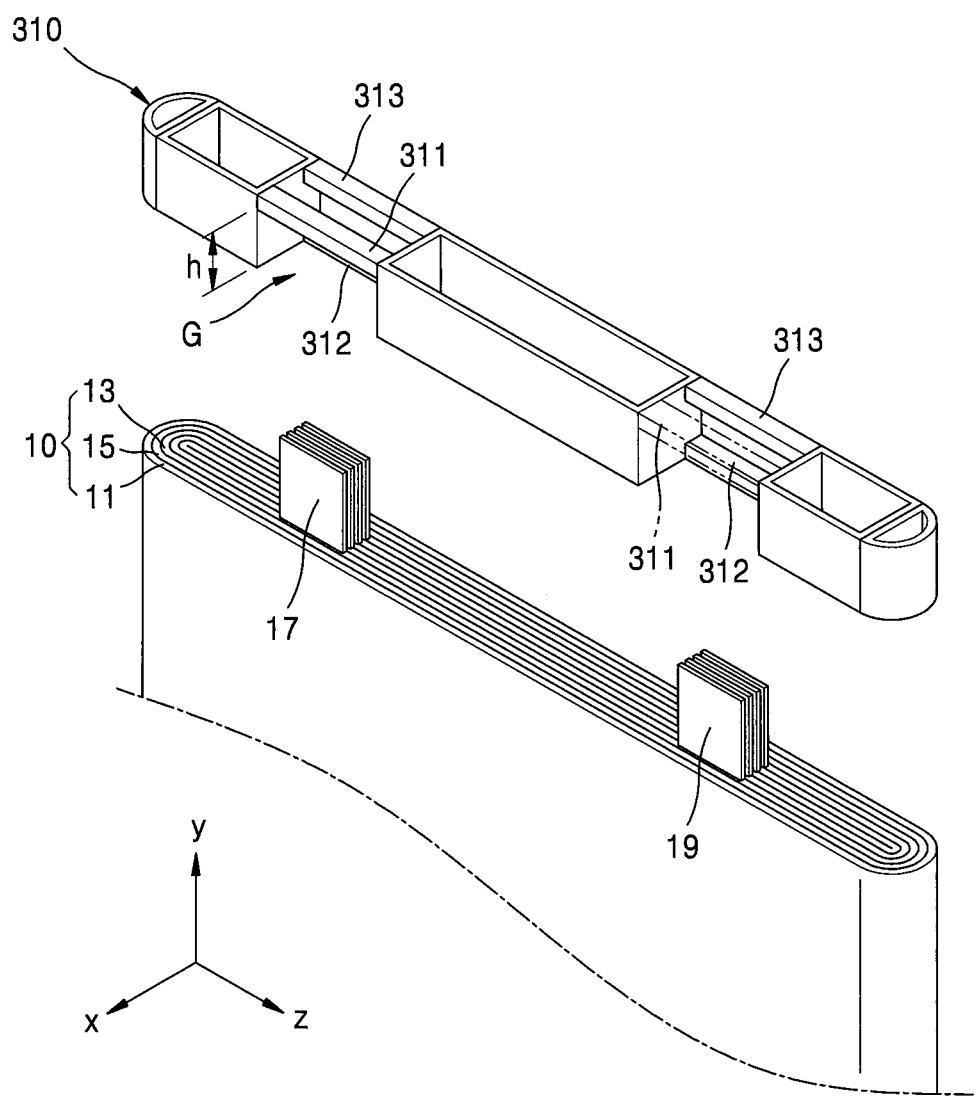
FIG. 8 is a perspective view of an insulating spacer according to another embodiment of the present invention.

FIG. 8 is a perspective view of an insulating spacer 310 according to another embodiment of the present invention. Referring to FIG. 8, the insulating spacer 310 may include welding grooves G for welding the electrode tabs 17 and 19 and the electrode leads 127 and 129. A height h of the welding grooves G may be defined by first ribs 311, second ribs 312 and third ribs 313 that are formed at the front and back sides (in the x direction) of the locations where the electrode tabs 17 and 19 are assembled to the insulating spacer 310.

The first to third ribs 311 to 313 includes a pair of ribs that are formed at different levels in the height direction (the y direction) of the insulating spacer 310. In one embodiment, the first and second ribs 311 and 312, which are formed at the front and back sides (in the x direction), are at different levels. For example, the first ribs 311 at the front side may be formed at an upper portion, and the second ribs 312 at the back side may be formed at a lower portion. Also, the third ribs 313 at the back side may be formed at the same upper portion as the first ribs 311 at the front side. The upper and lower portions may be the highest level and the lowest level of the insulating spacer 210, respectively.

For example, the first and second ribs 311 and 312, which are respectively formed at the front and back sides, may be the pair of ribs that are formed at different levels in the height direction (the y direction) of the insulating spacer 310. Also, the first and third ribs 311 and 313, which are respectively formed at the front and back sides, may be a pair of ribs that are formed at the same or substantially the same level in the height direction (the y direction) of the insulating spacer 310.

According to the embodiment illustrated in FIG. 8, the electrode tabs 17 and 19 may be directly assembled from the front side to the back side, and thus, it is unnecessary to insert the electrode tabs 17 and 19 into the tab holes 110' as shown in FIG. 6. Accordingly, the assembling process may be more efficient and a manufacturing yield per time unit may be improved.

The first ribs 311 that are raised to the upper portion at the front side may allow the electrode tabs 17 and 19 to be directly assembled from the front side. That is, the electrode tabs 17 and 19 may be assembled from the front side to the back side, and thus, it is unnecessary to insert the electrode tabs 17 and 19 into the tab holes 110' as shown in FIG. 6. Also, since the second and third ribs 312 and 313 at the back side support the electrode tabs 17 and 19 at the lower and upper portions, respectively, the process of welding the electrode tabs 17 and 19 may be stably performed and the electrode tabs 17 and 19 may be prevented or substantially prevented from bending and being short-circuit with other elements.

Figure 9:
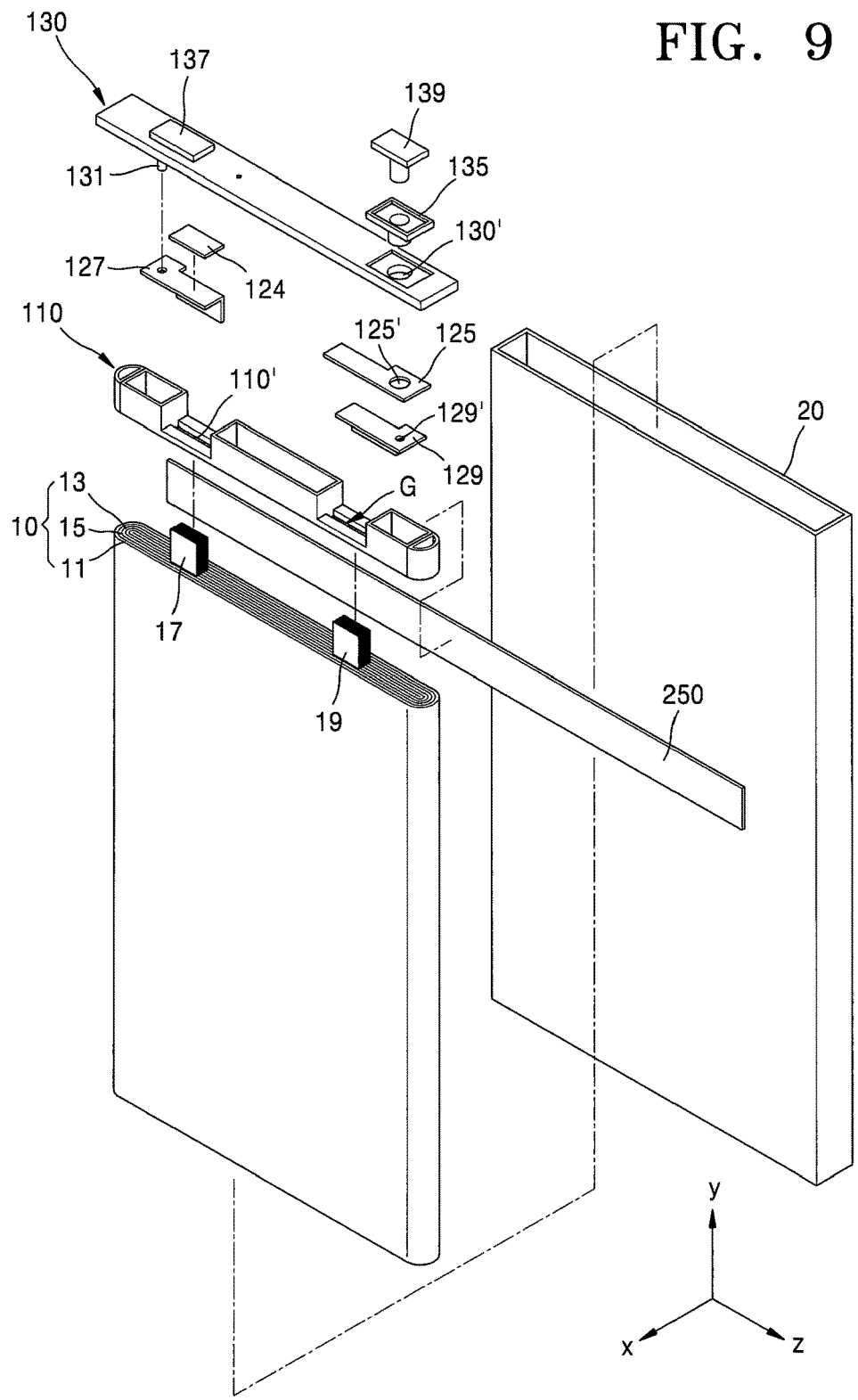
FIG. 9 is an exploded perspective view of a modified insulator according to another embodiment of the present invention.
Figure 10:
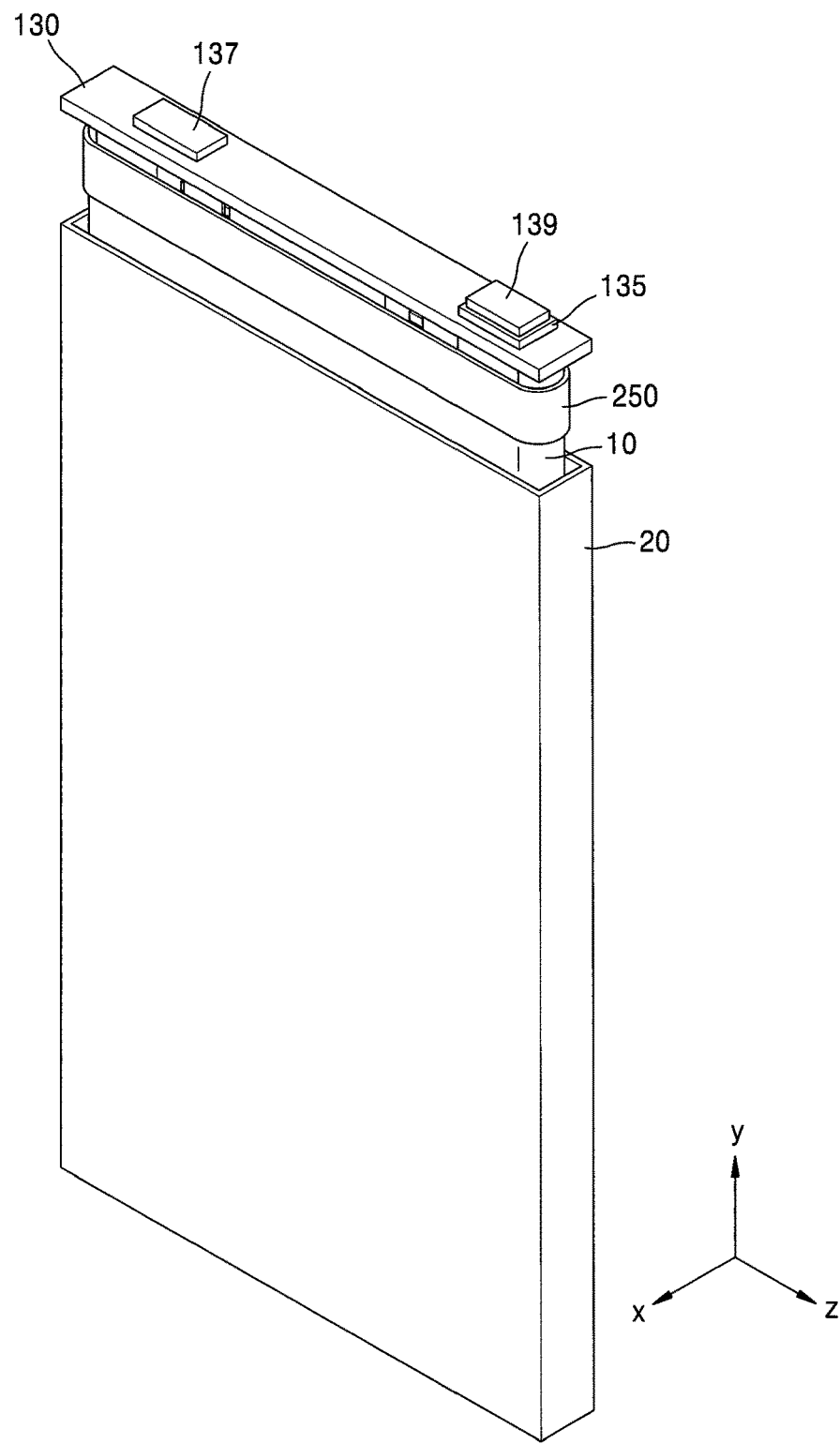
FIG. 10 is a diagram illustrating a coupling structure between elements of FIG. 9.
Figure 11:
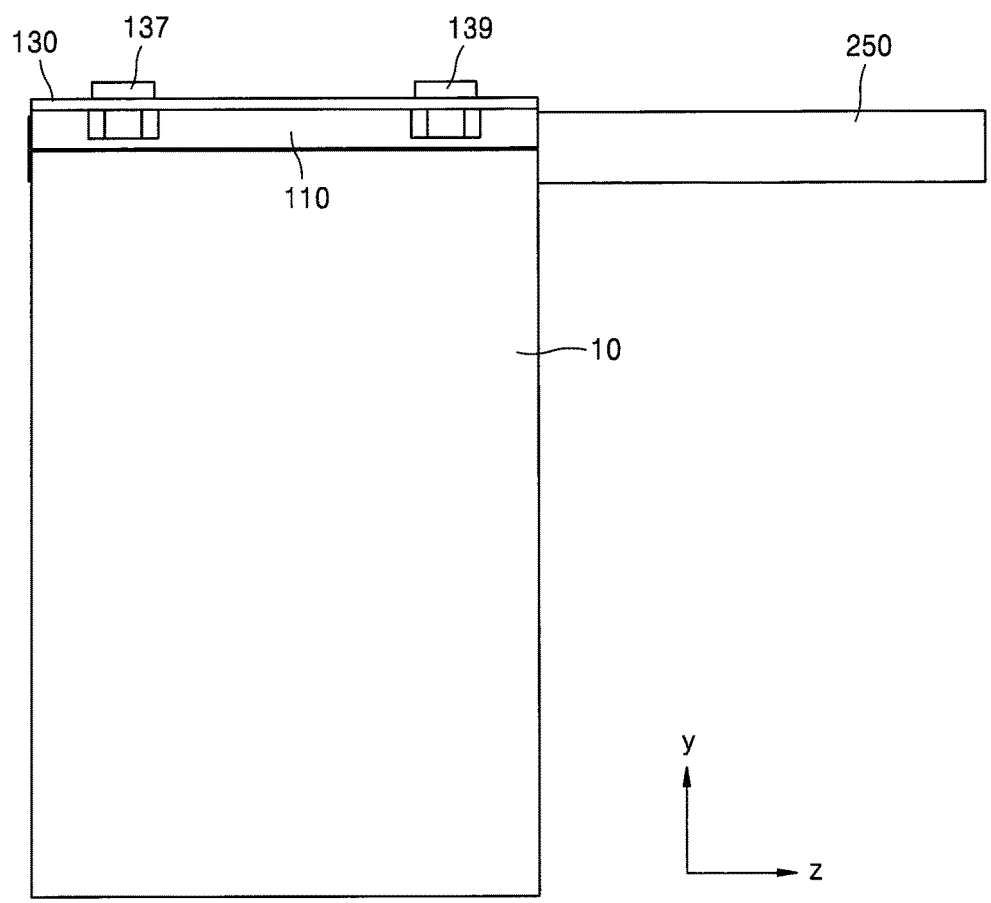
FIG. 11 is a diagram illustrating winding the insulator of FIG. 9.

FIG. 9 is an exploded perspective view of a modified insulator 250 according to another embodiment of the present invention. FIG. 10 is a diagram illustrating a coupling structure between elements of FIG. 9. FIG. 11 is a diagram illustrating winding the insulator 250 of FIG. 9.

Referring to the drawings, the insulator 250 may be attached along a periphery of the insulating spacer 110 to seal the welding grooves G formed in the insulating spacer 110. Here, the insulator 250 may be wound to surround peripheries of the insulating spacer 110 and the electrode assembly 10. That is, the insulating spacer 110 and the electrode assembly 10 may be coupled to each other by using the insulator 250.

The insulator 250 may be a tape that may surround a contact portion between the insulating spacer 110 and the electrode assembly 10. For example, the insulator 250 may be attached such that both of the peripheries of the insulating spacer 110 and the electrode assembly 10 are covered.

The insulator 250 couples the insulating spacer 110 to the electrode assembly 10 so that an insulating property of the electrode tabs 17 and 19 may be improved. For example, since the insulating spacer 110 is coupled to the electrode assembly 10, locations of the electrode tabs 17 and 19 that are assembled on the insulating spacer 110 may be firmly fixed and the electrode tabs 17 and 19 may be prevented or substantially prevented from touching inner walls of the case 20 and being short-circuit.

The electrode assembly 10 and the insulating spacer 110, which are coupled to each other by the insulator 250, may be accommodated in the case 20 together. Since the electrode assembly 10 and the insulating spacer 110 are coupled to each other, they may be easily inserted into the case 20. The insulator 250 may be formed between peripheral surfaces of the electrode assembly 10 and the insulating spacer 110 and inner surfaces of the case 20. The insulator 250 may prevent or substantially prevent movements of the electrode assembly 10 due to a clearance between the electrode assembly 10 and the case 20 and prevent or substantially prevent the electrode tabs 17 and 19 from touching the inner walls of the case 20.

For example, since the electrode assembly 10 and the insulating spacer 110 are coupled to each other, the locations of the electrode tabs 17 and 19 that penetrate through the insulating spacer 110 may be firmly fixed. That is, the locations of the electrode tabs 17 and 19 may be firmly fixed regardless of an external impact caused by being dropped or other reasons, and thus, for example, it is possible to prevent or substantially prevent a short-circuit or electric interference with the case 20 around the electrode tabs 17 and 19. In one embodiment, since high-capacity high output batteries include a plurality of electrode tabs 17 and 19, there is a greater possibility of occurrence of electrical short-circuits caused by the electrode tabs 17 and 19 contacting the inner walls of the case 20, and thus, it is necessary to improve the insulating property of the electrode tabs 17 and 19. Therefore, the embodiments of the present invention which includes the insulator 250 may be used for high-capacity high output batteries.

Batteries may be exposed to high frequency environments during operation. For example, a battery that is used as a driving power source of an electric tool may be exposed to high frequency vibrations, depending on the operation of the electric tool. Also, a battery may be exposed to a free-falls in which the battery is dropped to test safety.

According to an embodiment of the present invention, the electrode assembly 10 and the insulating spacer 110 may be coupled to each other so that the insulating property of the electrode assembly 10, for example, the insulating property of the electrode tabs 17 and 19, may be highly reliable even in harsh environments created by high frequency vibrations or impacts from being dropped.

The insulator 250 may be formed as a tape that is continuously formed along the periphery of the electrode assembly 10 such that the peripheries of the electrode assembly 10 and the insulating spacer 110 are covered.

If a coupling strength of the insulator 250 that couples the electrode assembly 10 and the insulating spacer 110 is higher than a level (e.g., a predetermined level), the insulator 250 may be formed as below. For example, the insulator 250 may be discontinuously formed along the peripheries of the electrode assembly 10 and the insulating spacer 110. Alternatively, the insulator 250 may not be completely covering, but partially covering the peripheries of the electrode assembly 10 and the insulating spacer 110.

If a coupling strength of the insulator 250 that couples the electrode assembly 10 and the insulating spacer 110 is higher than a level (e.g., a predetermined level), the locations of the electrode tabs 17 and 19 that are exposed through the insulating spacer 110 may be covered, and thus, the electrode tabs 17 and 19 may be insulated.

According to another embodiment of the present invention, the insulator 250 may completely cover the electrode assembly 10 and the insulating spacer 110. For example, the insulator 250 may cover the electrode assembly 10 and the insulating spacer 110 in a form of a spiral, and thus completely cover the electrode assembly 10 and the insulating spacer 110. In this case, "completely covered" may indicate that, for example, the peripheral surfaces of the electrode assembly 10 and the insulating spacer 110 are completely covered. The insulator 250 may be mostly wound in a direction that is the same or substantially the same as a direction in which the electrode assembly 10 is wound, and thus, completely cover the peripheral surfaces of the electrode assembly 10 and the insulating spacer 110.

Figure 12A:
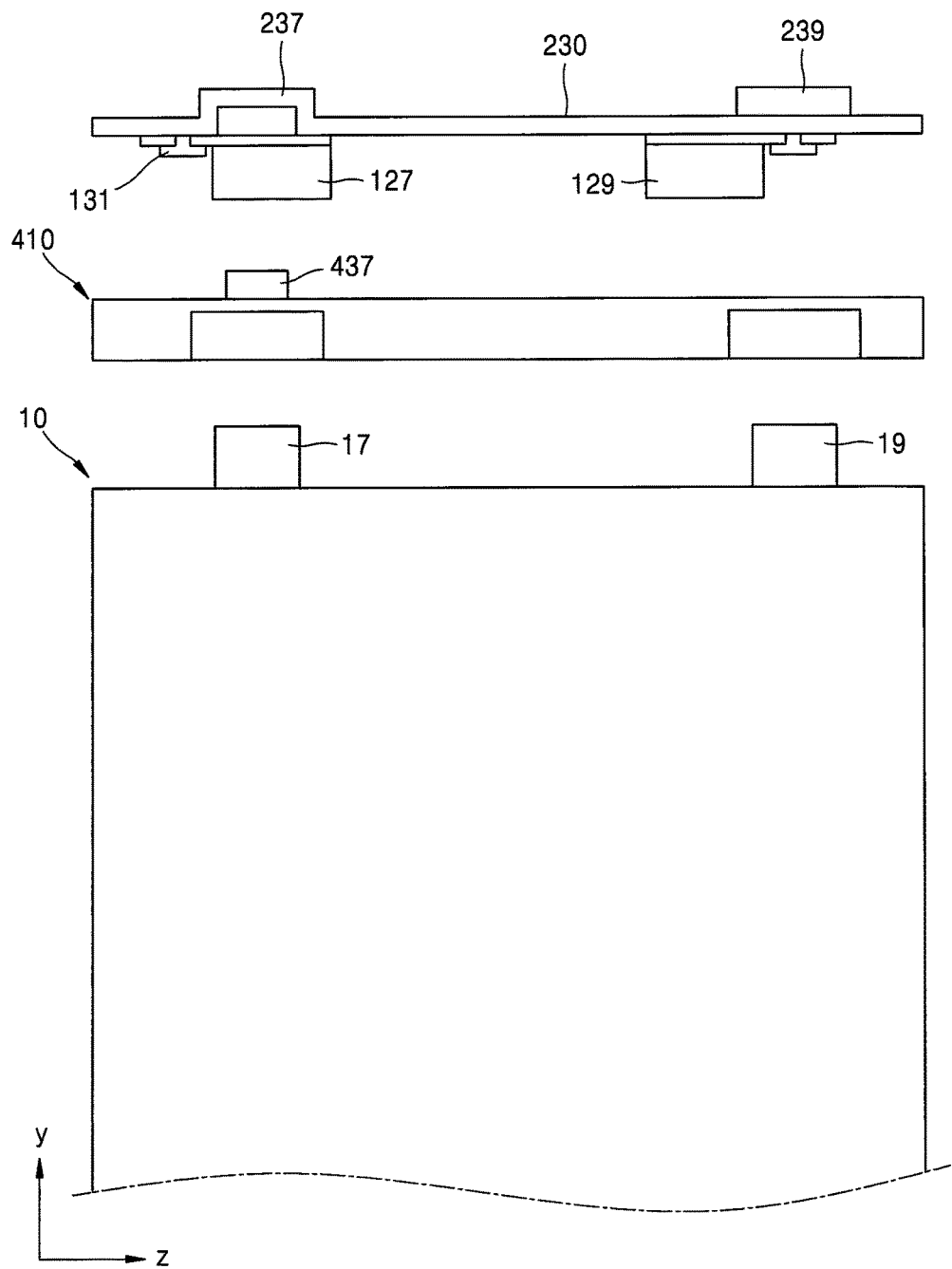
FIGS. 12A and 12B are diagrams illustrating a modified embodiment of the present invention.
Figure 12B:
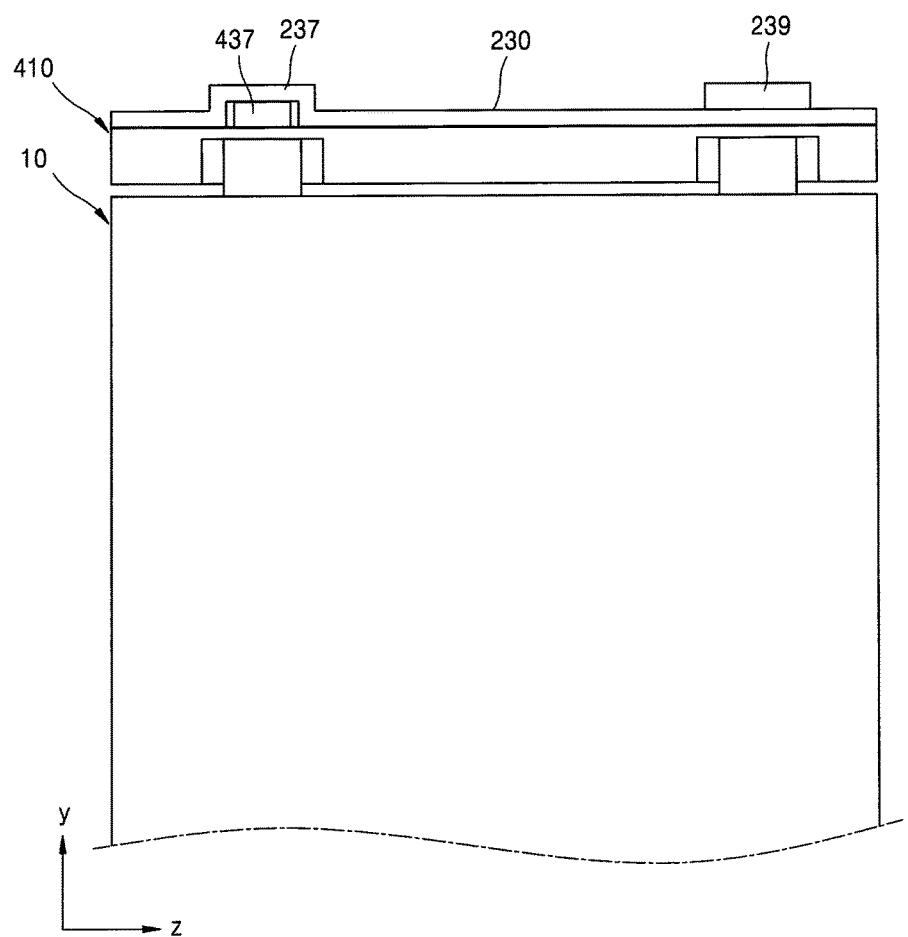

FIGS. 12A and 12B are diagrams for explaining a modified embodiment of the present invention. Referring to the drawings, the battery includes the electrode assembly 10, a cap plate 230 on the electrode assembly 10, and an insulating spacer 410 between the electrode assembly 10 and the cap plate 230.

The insulating spacer 410 and the cap plate 230 include a coupling structure to couple them to each other. For example, the cap plate 230 includes a positive electrode terminal 237 and a negative electrode terminal 239 that are exposed through an upper surface thereof. In a further embodiment, the positive electrode terminal 237 may be integral with and protrude from the cap plate 230. In addition, a lower surface of the positive electrode terminal 237 may be concave. For example, the positive electrode terminal 237 with the above structure may be formed by designing a mold for forming the cap plate 230.

The insulating spacer 410 may include a protrusion 437 that matches with the positive electrode terminal 237. The positive electrode terminal 237 and the protrusion 437, which have matching shapes, may be coupled to each other, and thus, the cap plate 230 may be coupled to the insulating spacer 410. For example, after the cap plate 230 and the electrode leads 127 and 129 are coupled by using the coupling pin 131 or the negative electrode terminal 239, the cap plate 230 may be coupled to the insulating spacer 410. Then, the electrode tabs 17 and 19 may be welded to the electrode leads 127 and 129. The cap plate 230 may be coupled to the insulating spacer 410 by using the positive electrode terminal 237 and the protrusion 437, which have matching shapes.

According to the embodiment illustrated in FIGS. 12A and 12B, the cap plate 230 is coupled to the insulating spacer 410 by using the positive electrode terminal 237 that is integral with and protrudes from the cap plate 230. This embodiment uses the positive electrode terminal 237 of the cap plate 230 and omits additional elements for coupling. However, the embodiments of the present invention are not limited thereto. For example, the protrusion 437 may be formed at any one of the cap plate 230 and the insulating spacer 410, and a unit with a hole (i.e., an opening) or a concave unit having a shape corresponding to the protrusion 437 may be formed at the other of the cap plate 230 and the insulating spacer 410, which does not have the protrusion 437. Thus, the cap plate 230 and the insulating spacer 410 may be coupled to each other. The concave unit is a term with a broad meaning that includes any structure into which a convex protrusion may be inserted. For example, the concave unit may be a hole or a depression.

Figure 13A:
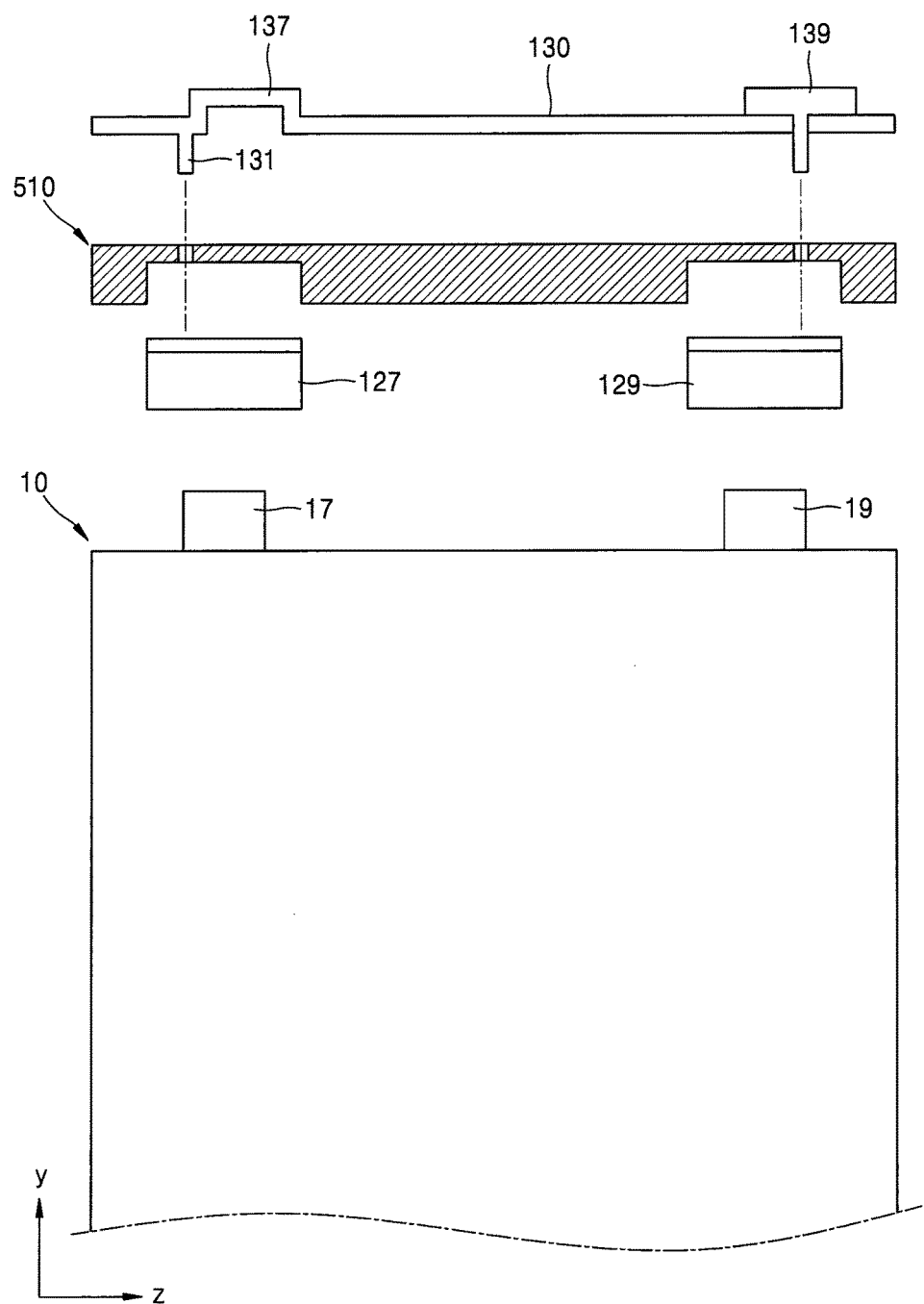
FIGS. 13A and 13B are diagrams illustrating a modified embodiment of the present invention.
Figure 13B:
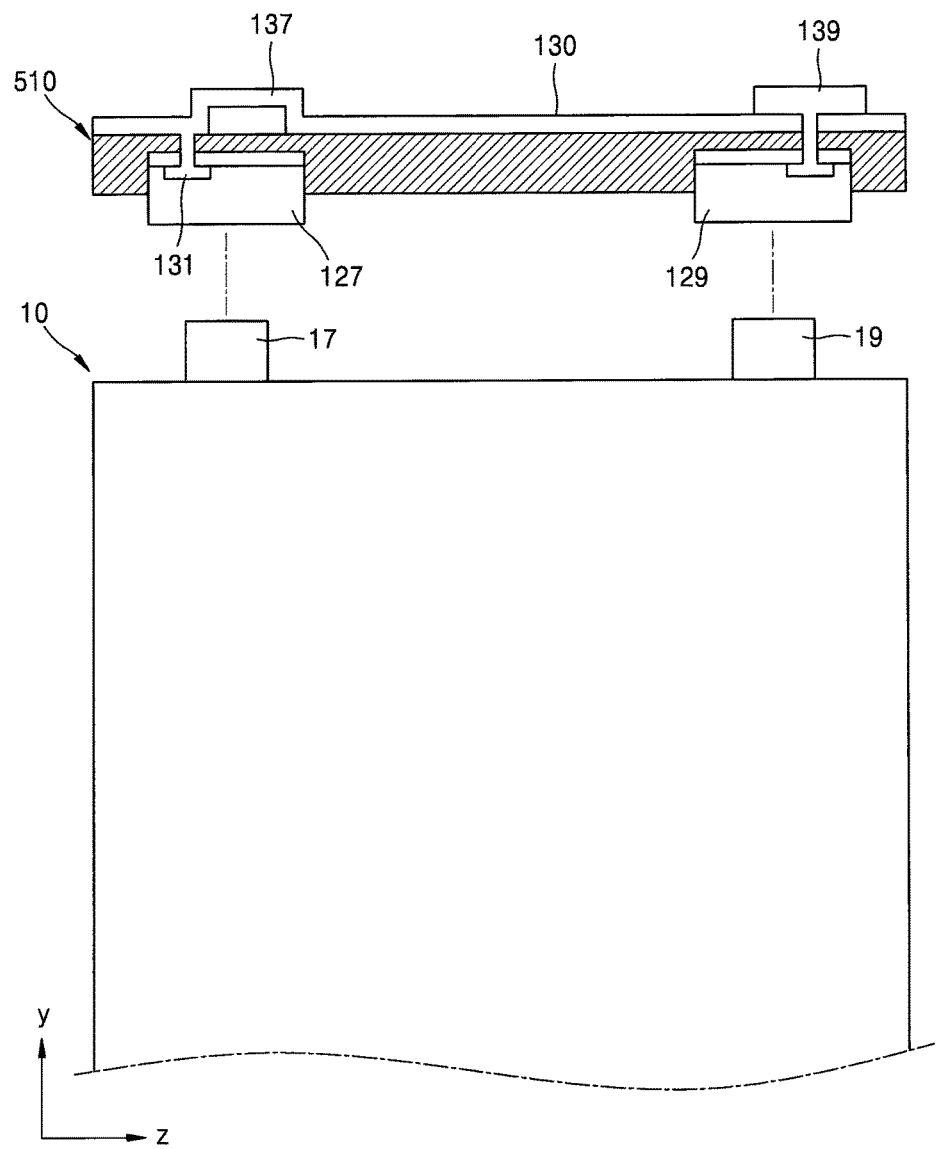

FIGS. 13A and 13B are diagrams illustrating a modified embodiment of the present invention. Referring to the drawings, the battery includes the electrode assembly 10, the cap plate 130 on the electrode assembly 10, and an insulating spacer 510 between the electrode assembly 10 and the cap plate 130. The insulating spacer 510 may be under the cap plate 130 and insulate the cap plate 130. That is, the insulating spacer 510 may insulate the cap plate 130 from the electrode leads 127 and 129. For example, the insulating spacer 510 may perform the functions of the insulating spacer 110 and the insulating plates 124 and 125 of FIG. 1.

The cap plate 130, the insulating spacer 510, and the electrode leads 127 and 129 may be disposed in the order of the cap plate 130, the insulating spacer 510, and the electrode leads 127 and 129, and they may be integrally combined by a single process. For example, the cap plate 130, the insulating spacer 510, and the electrode leads 127 and 129 are sequentially disposed, and they may be integrally coupled by using the coupling pins 131 that protrude from the cap plate 130 and the negative electrode terminal 139, respectively.

In more detail, the coupling pin 131 that protrudes from the cap plate 130 may be sequentially inserted into the insulating spacer 510 and the positive electrode lead 127. The lower portion of the coupling pin 131, which is exposed through the lower surface of the positive electrode lead 127, may be pressed on to the lower surface of the positive electrode lead 127 by using a riveting method and/or a spinning method.

Also, the negative electrode terminal 139 is assembled on the upper portion of the cap plate 130 such that the cap plate 130, the insulating spacer 510, and the negative electrode lead 129 are sequentially penetrated, and the lower portion of the negative electrode terminal 139, which is exposed through the lower surface of the negative electrode lead 129, is processed by using the riveting method and/or the spinning method. Thus, the lower portion of the negative electrode terminal 139 may be pressed onto the lower surface of the negative electrode lead 129.

Since the insulating spacer 510 may perform the functions of the insulating spacer 110 and the insulating plates 124 and 125 of FIG. 1, the insulating plates 124 and 125 may be omitted.

Figure 14:
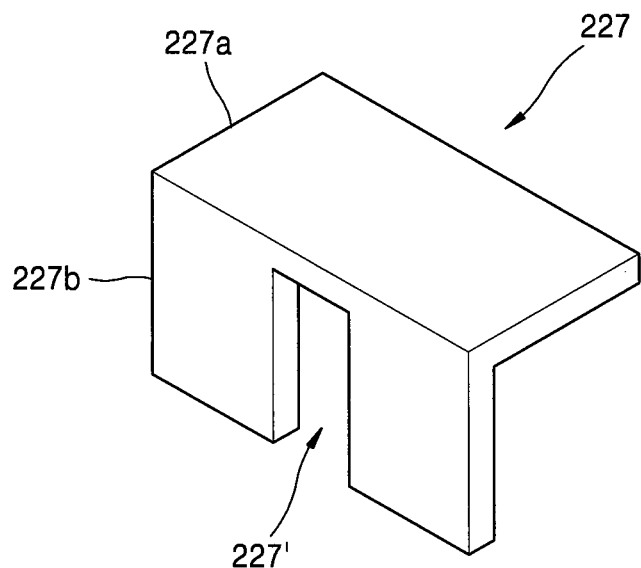
FIG. 14 is a diagram of a structure of a positive electrode lead according to a modified embodiment of the present invention.

FIG. 14 is a diagram of a structure of a positive electrode lead 227 according to a modified embodiment of the present invention. Referring to FIG. 14, the positive electrode lead 227 may include a first part 227a that is disposed to face the cap plate 130, and a second part 227b that is disposed to face the positive electrode tab 17. The second part 227b may have a divided form.

In one embodiment, the second part 227b of the positive electrode lead 227 may include a coupling hole (e.g., coupling opening) 227' to avoid mechanical interference between the second part 227b and the coupling pin 131. When an end of the coupling pin 131 undergoes a riveting or spinning process during a process of coupling the cap plate 130 and the positive electrode lead 227, the coupling hole 227' provides an extra space for accommodating an end of the coupling pin 131 which is expanded by being pressed with a manufacturing tool. That is, an end of the coupling pin 131 is formed as a head unit that expands to the outside and pressed onto a coupling surface, and the head unit may be accommodated in the coupling hole 227'.

The positive electrode lead 227 may include the first part 227a that is shaped like a whole plate, the second part 227b that is divided into two parts by the coupling hole 227', and the first and second parts 227a and 227b may be bent with respect to each other.

According to another embodiment of the present invention, the positive electrode lead 227 may not have the coupling hole 227'. For example, the positive electrode lead 227 may not have the coupling hole 227' according to a size of the coupling pin 131 that is used to couple the cap plate 130 and the positive electrode lead 227. For example, if the coupling pin 131 is relatively large, i.e., if the coupling pin 131 has a large diameter, the positive electrode lead 227 may have the coupling hole 227'. Alternatively, if the coupling pin 131 is relatively small, i.e., if the coupling pin 131 has a small diameter, the coupling hole 227' may not be formed in the positive electrode lead 227. If the coupling hole 227' is formed in the positive electrode lead 227, the mechanical strength may be decreased because the second part 227b of the positive electrode lead 227 is divided. For example, the size of the coupling pin 131 may vary according to mechanical strength that is required between the cap plate 130 and the positive electrode lead 227.

Figure 15A:
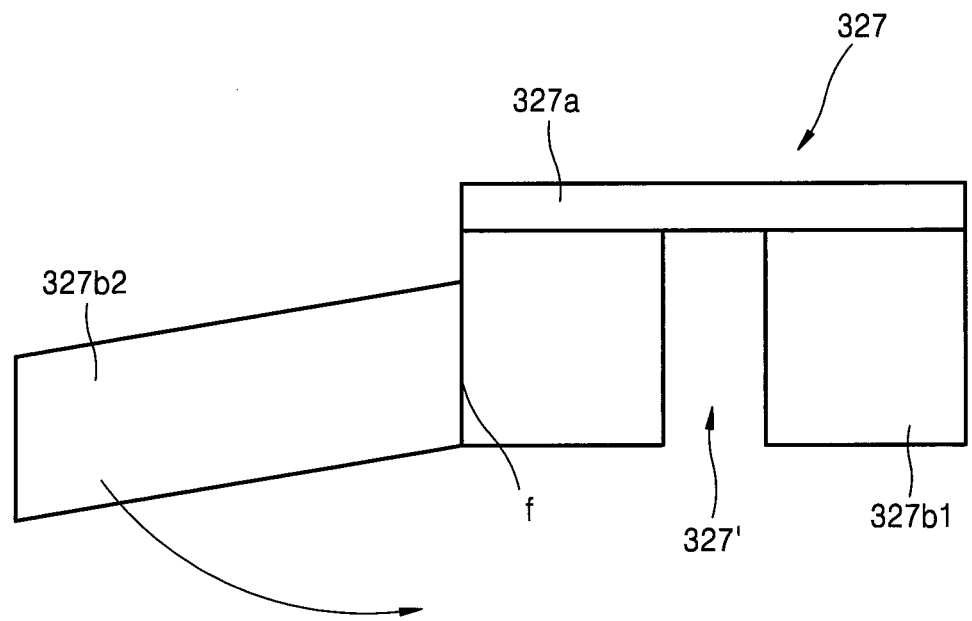
FIGS. 15A to 15C are diagrams of a structure of a positive electrode lead according to a modified embodiment of the present invention.
Figure 15B:
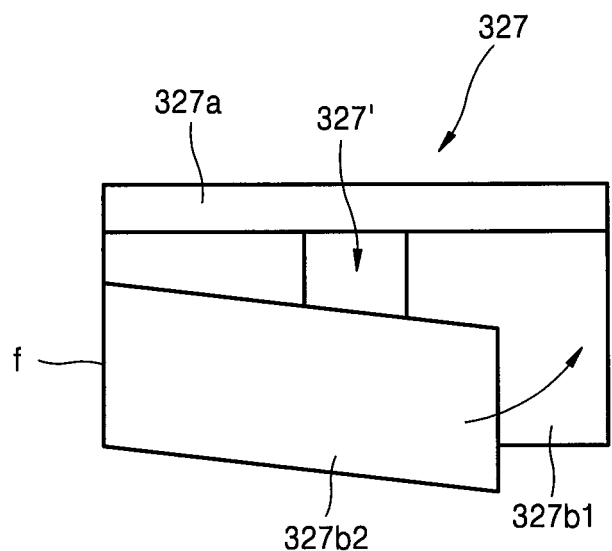
Figure 15C:
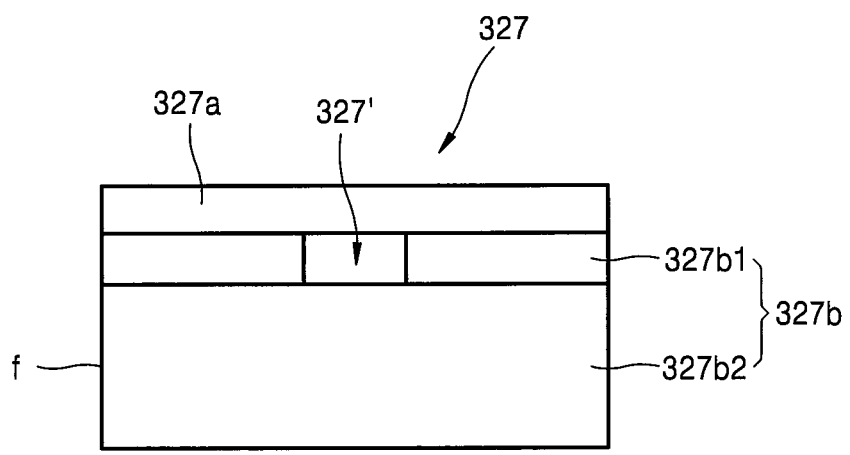

FIGS. 15A to 15C are diagrams of a structure of a positive electrode lead 327 according to a modified embodiment of the present invention. The positive electrode lead 327 may be partially or entirely formed in two layers. The positive electrode lead 327 may include a first part 327a that is coupled to the cap plate 130, and a second part 327b that is coupled to the positive electrode tab 17. The second part 327b may be formed in two layers. That is, as illustrated in the drawings, the second part 327b of the positive electrode lead 327 may have a two layer structure which includes a first layer 327b1 and a second layer 327b2. The first layer 327b1 is connected to the first part 327a and divided into two parts by a coupling hole (e.g., coupling opening) 327'. Also, the second layer 327b2 is connected to the first layer 327b1, and formed as a full plate. The second layer 327b2 overlaps a folded portion f of the first layer 327b1, and thus the second part 327b having a two layer structure is formed. The second layer 327b2 may cover a portion of the coupling hole 327' formed in the first layer 327b1, but the second layer 327b2 may be narrower than the first layer 327b1 such that at least a portion of the coupling hole 327' (a portion of the coupling hole 327' that is near the first part 327a) is exposed.

If the positive electrode lead 327 is partially or entirely formed in two layers, a mechanical strength of the positive electrode lead 327 may be increased. If the mechanical strength of the positive electrode lead 327 is increased, the positive electrode lead 327 may move less.

Figure 16A:
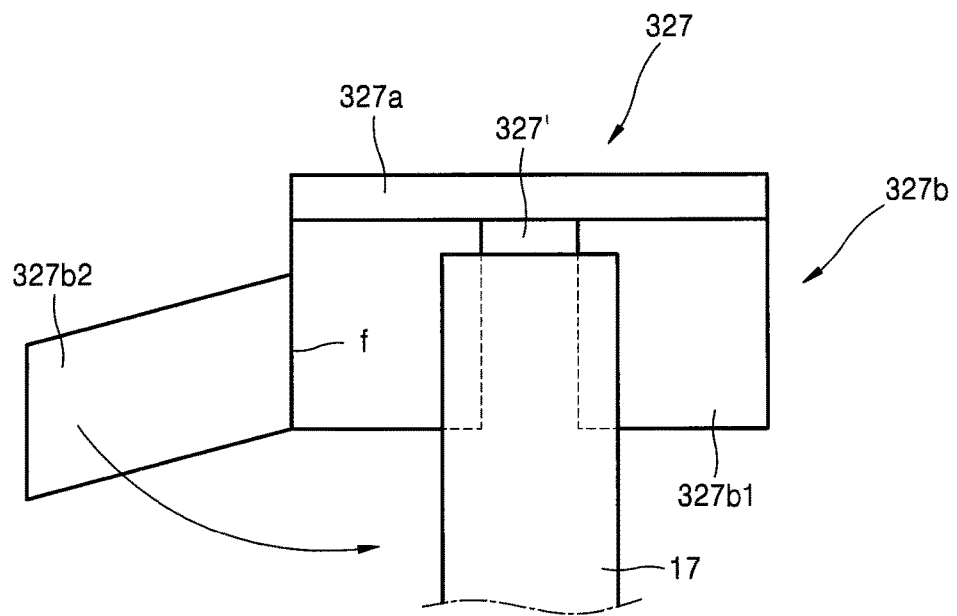
FIGS. 16A and 16B are diagrams of different structures to which the positive electrode leads of FIGS. 15A to 15C may be applied.
Figure 16B:
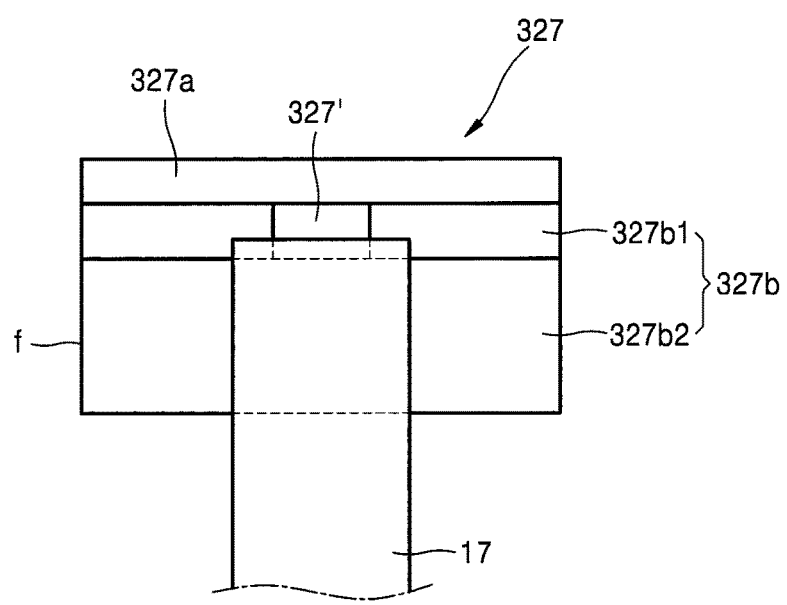

FIGS. 16A and 16B are diagrams of various structures in which the positive electrode lead 327 of FIGS. 15A to 15C are applied. In other words, as illustrated in FIGS. 16A and 16B, the second part 327b of the positive electrode lead 327, which is coupled to the positive electrode tab 17, is formed in two layers. In this case, according to the embodiment illustrated in FIG. 16A, the positive electrode tab 17 is disposed between the first layer 327b1 and the second layer 327b2. In other words, the positive electrode tab 17 overlaps on the first layer 327b1, and the second layer 327b2 covers the positive electrode tab 17. In other words, the first layer 327b1 and the second layer 327b2 may be at the front and back of the positive electrode tab 17 such that the positive electrode tab 17 is covered, and then welding may be performed. In this case, since the positive electrode lead 327, which includes the first and second layers 327b1 and 327b2, is covering the positive electrode tab 17, a welding strength may be improved.

If the positive electrode tab 17 is directly welded onto the first layer 327b1 such that a certain amount of space is excluded due to the coupling hole 327', a welded area is decreased by as much as the certain amount of space, and thus, the welding strength is decreased. Therefore, the welding is performed between the second layer 327b2 that has a complete shape and the positive electrode tab 17.

According to the embodiment illustrated in FIG. 16B, the second layer 327b2 is disposed on the first layer 327b1, and then, the positive electrode tab 17 is disposed thereon. That is, the positive electrode tab 17 is disposed on two layers formed by the first and second layers 327b1 and 327b2, the positive electrode tab 17 is disposed on the second layer 327b2, and the welding is performed therebetween. Similar to the description above, if the positive electrode tab 17 is directly welded onto the first layer 327 such that a certain amount of space is excluded due to the coupling hole 327', a welded area is decreased by as much as the certain amount of space, and thus, the welding strength is decreased. Therefore, the welding is performed between the second layer 327b2 that has a complete shape and the positive electrode tab 17.

Figure 17:
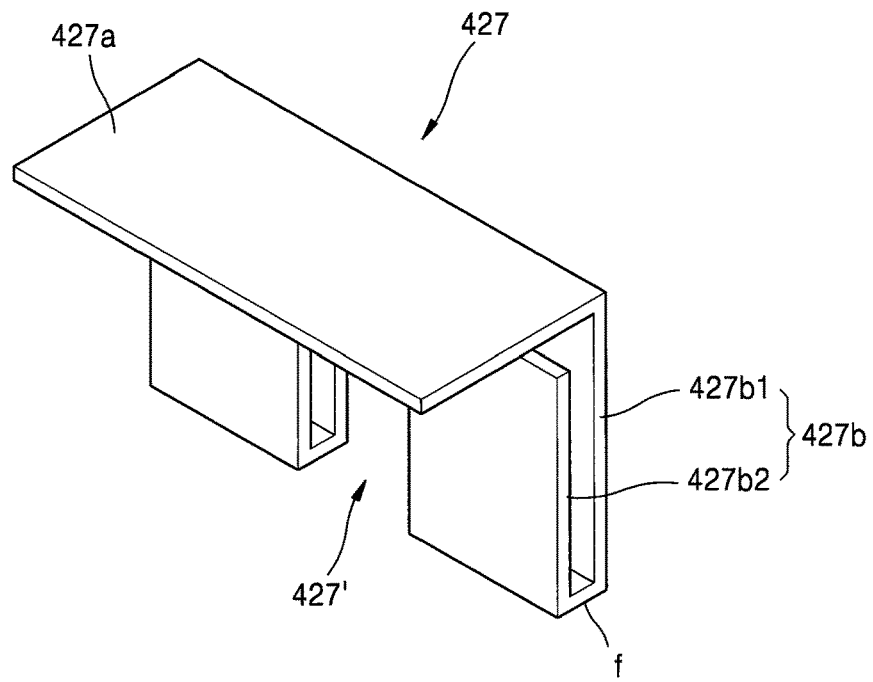
FIG. 17 is a structure of a positive electrode lead according to another embodiment of the present invention.

FIG. 17 is a diagram of a structure of a positive electrode lead 427 according to another embodiment of the present invention. The positive electrode lead 427 includes a second part 427b that is formed in two layers and coupled to the positive electrode tab 17. In this case, a first layer 427b1 and a second layer 427b2 of the second part 427b both include a coupling hole (i.e., a coupling opening) 427'. In one embodiment, the first and second layers 427b1 and 427b2 are connected to each other, bent with respect to each other around a folded portion f, and thus form two layers of the second part 427b. For example, the second layer 427b2 may be bent upward in a direction facing a first part 427a. The second layer 427b2 may be bent upward to contact the first part 427a. Accordingly, since the first part 427a may be supported by the first and second layers 427b1 and 427b2 of the second part 427b in different portions, a strength of a bending portion between the first and second parts 427a and 427b may be increased.

Figure 18:
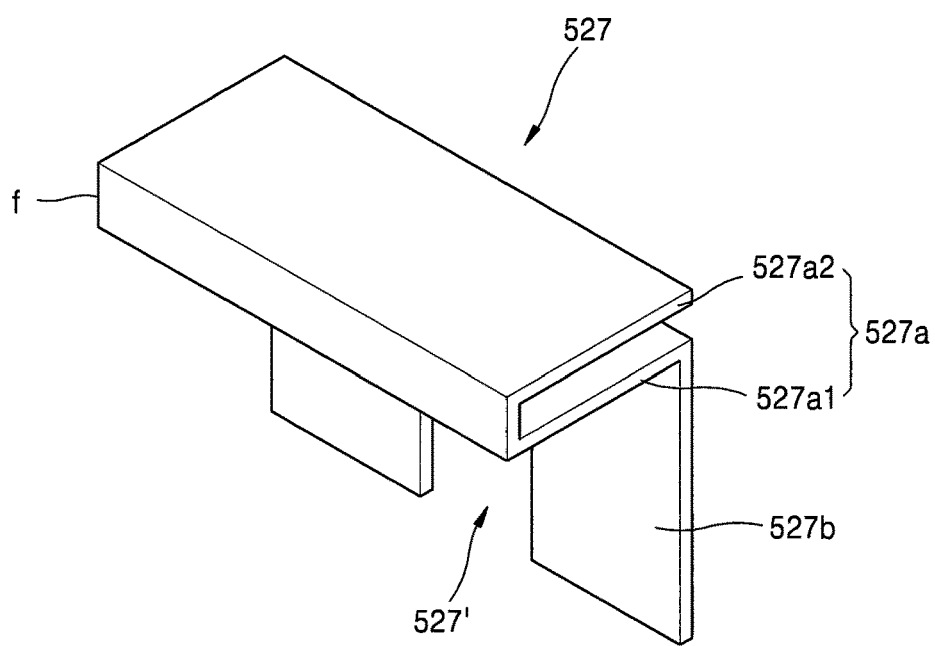
FIG. 18 is a structure of a positive electrode lead according to another embodiment of the present invention.

FIG. 18 is a diagram of a structure of a positive electrode lead 527 according to another embodiment of the present invention. The positive electrode lead 527 includes a first part 527a that is coupled to the cap plate 130 and has two layers. The first part 527a includes a first layer 527a1 and a second layer 527a2. The first and second layers 527a1 and 527a2 form the first part 527a having two layers by being connected to each other and overlapping each other. For example, the first and second layers 527a1 and 527a2 may be bent in a direction toward each other around a folded portion f.

Figure 19:
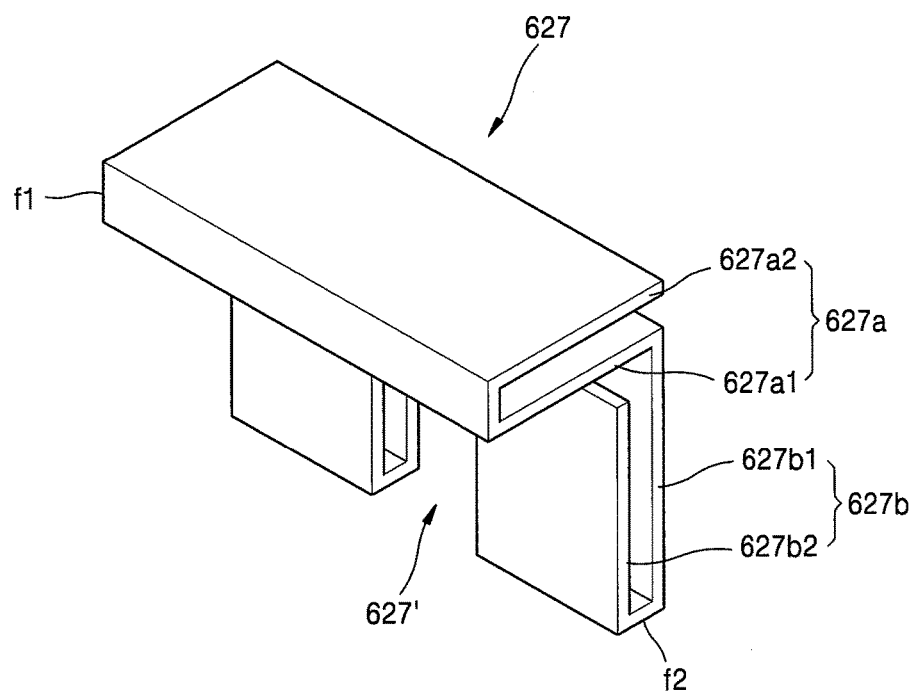
FIG. 19 is a structure of a positive electrode lead according to another embodiment of the present invention.

FIG. 19 is a diagram of a structure of a positive electrode lead 627 according to another embodiment of the present invention. Referring to FIG. 19, the positive electrode lead 627 includes a first part 627a and a second part 627b each formed in two layers. For example, the first part 627a includes a first layer 627a1 and a second layer 627a2 formed by bending the first part 627a at a first folded portion f1, and the second part 627b includes a first layer 627b1 and a second layer 627b2 formed by bending the second part 627b at a second folded portion f2.

According to an embodiment of the present invention, an insulating spacer is between an electrode assembly and a cap plate that seals an upper portion of the electrode assembly, and in the insulating spacer, a welding groove for exposing electrode tabs is formed at locations where the electrode tabs, which protrude from the electrode assembly, are assembled. Therefore, by including the insulating spacer, an insulating property of the electrode assembly may be improved, and the welding groove may secure a charge/discharge path of the electrode assembly.

According to another embodiment of the present invention, an insulating property of the electrode tabs may be improved by including an insulator for sealing the welding groove.

According to another embodiment of the present invention, the electrode assembly and the insulating spacer are coupled to each other by using the insulator, and thus, a highly reliable battery, in which the electrode tabs of the electrode assembly may be insulated from harsh environments created by high frequency vibrations or impacts caused by being dropped.

It should be understood that the exemplary embodiments described herein are for illustrative purposes only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their respective equivalents.

What is claimed is:
1. A battery comprising:
an electrode assembly comprising an electrode tab protruding from the electrode assembly;
an electrode lead to which the electrode tab is welded; and
an insulating spacer comprising a welding groove at which the electrode tab is welded to the electrode lead;
wherein the electrode tab protrudes from the electrode assembly through a tab hole in the insulating spacer and into the welding groove;
wherein, in the insulating spacer, the welding groove for exposing the electrode tab is at a location where the electrode tab is assembled to the insulating spacer; and
wherein the welding groove is defined by opposing surfaces of the insulating spacer that face each other and partially surround the welding groove.

2. The battery of claim 1, further comprising an insulator that is on and coupled to the insulating spacer to seal the welding groove.

3. The battery of claim 2, wherein the insulator couples the electrode assembly and the insulating spacer to each other.

4. The battery of claim 3, wherein the insulator completely surrounds the electrode assembly and the insulating spacer.

5. The battery of claim 2, wherein the insulator is a polymer film that becomes an adhesive when the insulator reacts with electrolyte.

6. The battery of claim 1, wherein the welding groove extends through a front side and a back side of the insulating spacer.

7. The battery of claim 1, wherein a height of the welding groove is defined by a first rib and a second rib that are at a front side and a back side of the insulating spacer, respectively.

8. The battery of claim 7, wherein the first and second ribs are at a lower portion of the insulating spacer, and
the welding groove is at an upper portion of the first and second ribs.

9. A battery comprising:
an electrode assembly comprising an electrode tab protruding from the electrode assembly;
an insulating spacer comprising a welding groove at which the electrode tab protruding from the electrode assembly is assembled to the insulating spacer; and
an electrode lead to which the electrode tab is welded,
wherein, in the insulating spacer, the welding groove for exposing the electrode tab is at a location where the electrode tab is assembled to the insulating spacer;
wherein a height of the welding groove is defined by a first rib and a second rib that are at a front side and a back side of the insulating spacer, respectively;
wherein the first rib at the front side is at an upper portion of the insulating spacer,
the second rib at the back side is at a lower portion of the insulating spacer, and
the welding groove comprises a space between the first and second ribs.

10. The battery of claim 1, wherein the insulating spacer comprises a surface which faces the electrode assembly, the surface being either an upper surface or a lower surface of the insulating spacer, wherein the surface has a largest contact area from among the upper surface and the lower surface of the insulating spacer.

11. The battery of claim 1, wherein the insulating spacer is coupled to a cap plate.

12. The battery of claim 11, wherein either the insulating spacer or the cap plate comprises a protrusion, and whichever of the insulating spacer and the cap plate that does not comprise the protrusion, comprises a hole or a concave unit having a shape corresponding to the protrusion.

13. The battery of claim 1, wherein the insulating spacer is between a cap plate and the electrode lead.

14. The battery of claim 1, wherein the welding groove is wider than the electrode tab.

15. The battery of claim 1, wherein the electrode assembly comprises a positive electrode plate, a negative electrode plate, and a separator between the positive and negative electrode plates, and
the positive electrode plate is at an outermost side of the electrode assembly.

16. The battery of claim 1, wherein the electrode lead is around the welding groove of the insulating spacer, and
the electrode lead is wider than the welding groove.

17. The battery of claim 1, wherein the electrode lead is comprised partially or entirely of two layers.

18. A battery comprising:
an electrode assembly comprising an electrode tab protruding from the electrode assembly;
an electrode lead to which the electrode tab is welded;
an insulating spacer comprising a welding groove into which the electrode tab extends and at which the electrode tab is welded to the electrode lead; and
wherein the welding groove is defined by opposing surfaces of the insulating spacer that face each other and partially surround the welding groove.

* * * * *